(12) United States Patent
Hwang et al.

(10) Patent No.: US 10,523,347 B2
(45) Date of Patent: Dec. 31, 2019

(54) METHOD AND APPARATUS FOR HANDLING RADIO LINK FAILURE IN SYSTEM USING MULTIPLE REFERENCE SIGNALS

(71) Applicant: Samsung Electronics Co., Ltd., Suwon-si, Gyeonggi-do (KR)

(72) Inventors: June Hwang, Incheon (KR); Hyunjeong Kang, Seoul (KR); Jungmin Moon, Suwon-si (KR); Seunghoon Park, Suwon-si (KR); Byounghoon Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/100,805

(22) Filed: Aug. 10, 2018

(65) Prior Publication Data

US 2019/0052377 A1    Feb. 14, 2019

(30) Foreign Application Priority Data

Aug. 10, 2017    (KR) .................. 10-2017-0101952
Sep. 27, 2017    (KR) .................. 10-2017-0125585
(Continued)

(51) Int. Cl.
*H04L 5/12*    (2006.01)
*H04B 17/309*    (2015.01)
(Continued)

(52) U.S. Cl.
CPC ......... *H04B 17/309* (2015.01); *H04B 7/0626* (2013.01); *H04W 24/08* (2013.01); *H04W 76/27* (2018.02); *H04L 25/0224* (2013.01)

(58) Field of Classification Search
CPC .. H04B 17/309; H04B 17/318; H04B 7/0626; H04W 76/27; H04W 24/08; H04W 56/0015; H04L 5/0053; H04L 25/0224
(Continued)

(56) References Cited

U.S. PATENT DOCUMENTS

2014/0064103 A1    3/2014 Dimou et al.
2014/0269368 A1    9/2014 Xu et al.
(Continued)

FOREIGN PATENT DOCUMENTS

KR    10-2017-0009347 A    1/2017
KR    10-2017-0012153 A    2/2017

OTHER PUBLICATIONS

3GPP; TSGRAN; E-UTRA, Requirements for support of radio resource management, (Release 14), 3GPP TS 36.133 V14.4.0, Jul. 7, 2017, See sections 4.4.4, 7.6.1, 7.19.1-7.19.2.
(Continued)

*Primary Examiner* — Zewdu A Kassa
(74) *Attorney, Agent, or Firm* — Jefferson IP Law, LLP

(57) ABSTRACT

A communication method and a system for converging a 5th-generation (5G) communication system for supporting higher data rates beyond a 4th-generation (4G) system with a technology for internet of things (IoT) are provided. The present disclosure may be applied to intelligent services based on the 5G communication technology and the IoT-related technology, such as smart home, smart building, smart city, smart car, connected car, etc. The method includes receiving a radio resource control (RRC) message including first information associated with a reference signal for a radio link monitoring (RLM) and second information associated with a threshold for the RLM, monitoring a radio link quality of at least one reference signal indicated by the first information, comparing the radio link quality of the at
(Continued)

least one reference signal with the threshold and indicating an in-sync or an out-of-sync to a higher layer of the terminal based on the comparison result.

14 Claims, 24 Drawing Sheets

(30) Foreign Application Priority Data

Nov. 16, 2017 (KR) .................. 10-2017-0153298
Jan. 11, 2018 (KR) .................. 10-2018-0004052

(51) Int. Cl.
*H04W 76/27* (2018.01)
*H04B 7/06* (2006.01)
*H04W 24/08* (2009.01)
*H04L 25/02* (2006.01)

(58) Field of Classification Search
USPC ........ 375/262, 260, 261, 259, 295, 316, 219
See application file for complete search history.

(56) References Cited

U.S. PATENT DOCUMENTS

| | | |
|---|---|---|
| 2017/0019162 A1 | 1/2017 | Jeong et al. |
| 2017/0041112 A1 | 2/2017 | Kim et al. |
| 2017/0180095 A1 | 6/2017 | Xue et al. |
| 2018/0249526 A1* | 8/2018 | Nagaraja ............... H04W 24/08 |
| 2019/0089579 A1* | 3/2019 | Sang .................... H04W 40/36 |

OTHER PUBLICATIONS

International Search Report dated Nov. 16, 2018, issued in International Application No. PCT/KR2018/009146.

* cited by examiner

METHOD AND APPARATUS FOR HANDLING RADIO LINK FAILURE IN SYSTEM USING MULTIPLE REFERENCE SIGNALS

CROSS-REFERENCE TO RELATED APPLICATION(S)

This application is based on and claims priority under 35 U.S.C. § 119 of a Korean patent application number 10-2017-0101952, filed on Aug. 10, 2017, in the Korean Intellectual Property Office, of a Korean patent application number 10-2017-0125585, filed on Sep. 27, 2017, in the Korean Intellectual Property Office, of a Korean patent application number 10-2017-0153298, filed on Nov. 16, 2017, in the Korean Intellectual Property Office, and of a Korean patent application number 10-2018-0004052, filed on Jan. 11, 2018, in the Korean Intellectual Property Office, the disclosure of each of which is incorporated by reference herein in its entirety.

BACKGROUND

1. Field

The disclosure relates to an event for detecting a radio link failure in the mmWave system.

2. Description of Related Art

To meet the demand for wireless data traffic having increased since deployment of 4th-generation (4G) communication systems, efforts have been made to develop an improved 5th-generation (5G) or pre-5G communication system. Therefore, the 5G or pre-5G communication system is also called a 'Beyond 4G Network' or a 'Post long term evolution (LTE) System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency-shift keying (FSK) and quadrature amplitude modulation (QAM) modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The internet, which is a human centered connectivity network where humans generate and consume information, is now evolving to the internet of things (IoT) where distributed entities, such as things, exchange and process information without human intervention. The internet of everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered to be as an example of convergence between the 5G technology and the IoT technology.

Meanwhile, a radio link failure (RLF) may be found as follows. In the case of LTE, the downlink (DL) signal is monitored based on the cell-specific reference signal (CRS). The signal strength corresponding to the time-frequency location of the cell-specific reference signal is measured for a preset time and is averaged over the preset time. If the average value is less than a given signal-to-interference-plus-noise ratio (SINR) or signal-to-noise-ratio (SNR), occurrence of a DL radio link problem is notified to the higher layers.

In radio link failure handling, unlike radio resource management (RRM) beam management for scheduling fast beam tracking and cell mobility, whether the state of a link to the corresponding cell is acceptable is determined in a more extended period of time, and if the link state is not acceptable, the process of attaching to the cell itself is retried. In general, as the process of reattaching to the cell requires performing cell search and random access channel (RACH) and security related operations again, both radio processing and core network (CN) processing are required. It is also necessary to exchange data between the newly attached cell and the previous cell having caused a failure. Considering the cost of the radio resource control (RRC) reestablishment process, it is common to give a long monitoring time as possible.

In the case of omnidirectional radiation, when measuring the strength of the time-frequency resource of the CRS, the effects of multipath are all taken into account. When the signal strength is measured, factors affecting directionality have already been considered. Hence, only time factors (measurement duration, arithmetic mean, or moving average) may affect the measurement variation.

The above information is presented as background information only to assist with an understanding of the disclosure. No determination has been made, and no assertion is made, as to whether any of the above might be applicable as prior art with regard to the disclosure.

SUMMARY

In the case of the mmWave system, as all terminals in the cell coverage should perform radio link measurement, the reference signal (RS) should be transmitted through an analog beam instead of omnidirectional transmission. Depending on the situation of the system, multiple analog beams can be transmitted simultaneously, or one analog beam can be transmitted at a time. There may be an RS in the scheduled beam, and there may be a measurement time slot containing a separate measurement signal. Compared with the case of omnidirectional radiation, the directionality is another parameter affecting radio link failure (RLF) determination.

Aspects of the disclosure are to address at least the above-mentioned problems and/or disadvantages and to provide at least the advantages described below. Accordingly, an aspect of the disclosure is to newly define an event for notifying a radio link problem to the higher layer through a combination of the directionality parameter indicated by a specific analog beam and the time parameter.

Additional aspects will be set forth in part in the description which follows and, in part, will be apparent from the description, or may be learned by practice of the presented embodiments.

In accordance with an aspect of the disclosure, a method of a terminal is provided. The method includes receiving a radio resource control (RRC) message including first information associated with a reference signal for a radio link monitoring (RLM) and second information associated with a threshold for the RLM, monitoring a radio link quality of at least one reference signal indicated by the first information, comparing the radio link quality of the at least one reference signal with the threshold, and indicating an in-sync or an out-of-sync to a higher layer of the terminal based on the comparison result.

In accordance with another aspect of the disclosure, another method of a base station is provided. The method includes transmitting a radio resource control (RRC) message including first information associated with a reference signal for a radio link monitoring (RLM) and second information associated with a threshold for the RLM to a terminal and transmitting at least one of a synchronization signal block (SSB) or a channel state information-reference signal (CSI-RS), wherein the first information is used for indicating at least one of the SSB or the CSI-RS to be monitored for a radio link quality, and wherein the second information is used for comparing the radio link quality and the threshold to indicate an in-sync or an out-of-sync to a higher layer of the terminal.

In accordance with another aspect of the disclosure, a terminal is provided. The terminal includes a transceiver configured to transmit and receive a signal and at least one processor configured to receive a radio resource control (RRC) message including first information associated with a reference signal for a radio link monitoring (RLM) and second information associated with a threshold for the RLM, to monitor a radio link quality of at least one reference signal indicated by the first information, to compare the radio link quality of the at least one reference signal with the threshold, and to indicate an in-sync or an out-of-sync to a higher layer of the terminal based on the comparison result.

In accordance with another aspect of the disclosure, a base station is provided. The base station includes a transceiver configured to transmit and receive a signal and at least one processor configured to transmit a radio resource control (RRC) message including first information associated with a reference signal for a radio link monitoring (RLM) and second information associated with a threshold for the RLM to a terminal, and to transmit at least one of a synchronization signal block (SSB) and a channel state information-reference signal (CSI-RS), wherein the first information is used for indicating at least one of the SSB or the CSI-RS to be monitored for a radio link quality, and wherein the second information is used for comparing the radio link quality and the threshold to indicate an in-sync or an out-of-sync to a higher layer of the terminal.

In a feature of the disclosure, it is possible to define an event notifying a radio link problem by use of a scheme for out-of-sync and in-sync determination based on a reference signal (RS).

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
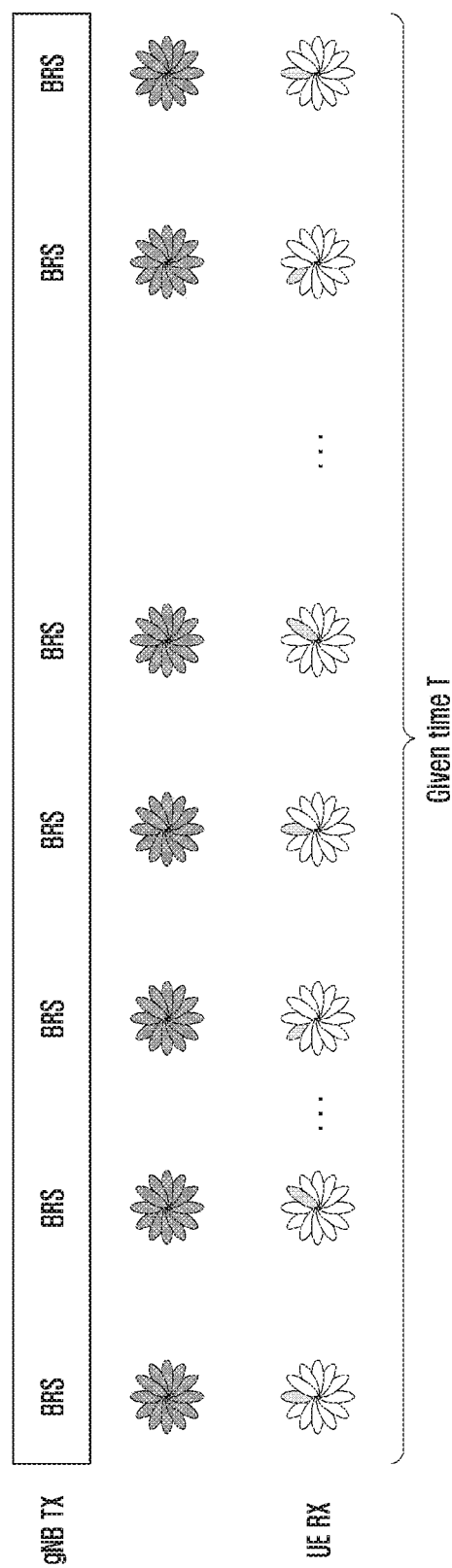
FIG. 1 illustrates a measurement slot according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The aspects, features and advantages of certain embodiments of the disclosure will be more apparent from the following detailed description taken in conjunction with the accompanying drawings. The description of the various embodiments does not describe every possible instance of the disclosure. It should be apparent to those skilled in the art that the following description of various embodiments is provided for illustration purpose only and not for the purpose of limiting the present disclosure as defined by the appended claims and their equivalents. The same reference symbols are used throughout the description to refer to the same parts.

In the following description, the terms "base station", "enhanced node B (eNB)", and "g node B (gNB)" may be interchangeably used. The terms "terminal" and "user equipment (UE)" may be interchangeably used.

As a measurement source, it is possible to measure the RS in the measurement slot, measure the reference signal (RS) of the scheduled beam, and measure the demodulation reference signal (DMRS) on the physical downlink control channel (PDCCH). These measurement values can be considered together. In the description, the beam measurement reference signal (BRS) is different from the cell-specific reference signal (CRS) in that it is a measurement RS carried by an analog beam and is used when two or more analog beams disjointly cover the cell coverage to serve one cell. The BRS may be carried by such beams and may be used to measure the reference signal received power (RSRP), the reference signal received quality (RSRQ), or the received signal strength indication (RSSI).

Embodiment 1: Considering Only the RS in the Measurement Slot (Only the SS is Configured)

FIG. 1 illustrates a measurement slot according to an embodiment of the disclosure.

Referring to FIG. 1, a measurement slot. In the beam sweeping slot, the gNB TX transmits beams each including the BRS while sweeping the beam in sequence. While the gNB is TX sweeping, the RX receives a specific beam and measures the BRS. Alternatively, when the gNB TX repeatedly transmits a beam including the BRS, the UE may sweep the RX beam. This method applies to the case of RS source variations proposed herein and to the case of in-sync determination. In any case, the term during which measurement can be performed for all combinations of TX beams and RX beams is referred to as term 1, and the specific time below can be multiple terms.

A. [Calculation for each pair of 1 TX beam and 1 RX beam] counting the values in different terms separately: when the N best measurement values among the measurement values for all TX-RX beam pairs measured during a specific time are less than a preset threshold, it is determined to be out-of-sync (OOS). Here, the measurement value in term 1 for a TX-RX beam pair and the measurement value in term 2 for the same TX-RX beam pair are regarded as different, and the measurement values in all terms for every beam pair are treated separately. If the N best measurement values are less than the out-of-sync (OOS) threshold, it is determined to be OOS.

B. [Calculation for each combination of 1 TX beam and M RX beams] counting the values in different terms separately: for each TX beam, M RX beams are selected first and the average (or linear combination) of the measurement values for the M RX beams is computed for a specific time. Here, the average value (or linear combination value) in term 1 for a TX-beam and the average value in term 2 for the same TX beam are regarded as different. If the N best values among the average values for all TX beams are less than the OOS threshold, it is determined to be OOS. Here, the value of M may be given or may be selected for each terminal based on a specific metric.

C. [Calculation for each pair of 1 TX beam and 1 RX beam] counting the values in different terms separately: in "A" case, the average (or linear combination) of the measurement values for the N selected beams is computed. If the average value (or linear combination value) is less than the OOS threshold, it is determined to be OOS.

D. [Calculation for each combination of 1 TX beam and M RX beams] counting the values in different terms separately: in "B" case, the average (or linear combination) of the N selected values is computed. If the average value (or linear combination value) is less than the OOS threshold, it is determined to be OOS. Here, the value of M may be given or may be selected for each terminal based on a specific metric.

E. [Calculation for each pair of 1 TX beam and 1 RX beam] using the term-wise average: a linear combination value of measurement values for all TX-RX beam pairs is calculated for each term during a specific time. If none of the N best values among the term-wise linear combination values is greater than the OOS threshold, it is determined to be OOS. Here, the value of M may be given or may be selected for each terminal based on a specific metric.

F. [Calculation for each combination of 1 TX beam and M RX beams] using the term-wise average: for each TX beam, M RX beams are selected first. A linear combination of the measurement values for the M RX beams is computed for each term during a specific time. If none of the N best values among the term-wise linear combination values is greater than the OOS threshold, it is determined to be OOS. Here, the value of M may be given or may be selected for each terminal based on a specific metric.

G. [Calculation for each pair of 1 TX beam and 1 RX beam]: in "E" case, a linear combination of the N best values is computed. If the linear combination value is less than the OOS threshold, it is determined to be OOS. Here, the value of M may be given or may be selected for each terminal based on a specific metric.

H. [Calculation for each combination of 1 TX beam and M RX beams]: in "F" case, a linear combination of the N best values is computed. If the linear combination value is less than the OOS threshold, it is determined to be OOS. Here, the value of M may be given or may be selected for each terminal based on a specific metric.

Embodiment 2: The RS is Present in the Scheduled Analog Beam in Addition to the Measurement Slot (the CSI-RS is Configured)

In this case, information on the RS resource location at the scheduled TX beam should be shared in advance.

Figure 2:
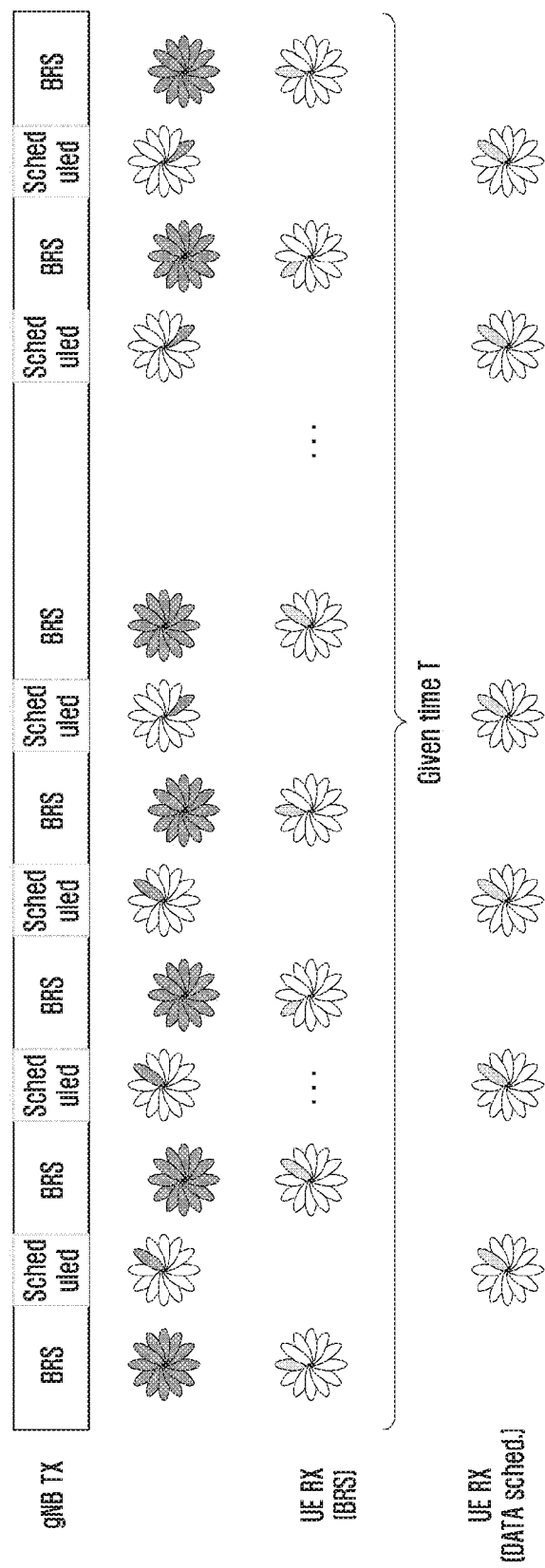
FIG. 2 illustrates a case where a measurement value for a beam scheduled in addition to the measurement in the measurement slot is added as a sample for a given time duration according to an embodiment of the disclosure.

FIG. 2 illustrates a case where a measurement value for a beam scheduled in addition to the measurement in the measurement slot is added as a sample for a given time duration according to an embodiment of the disclosure.

Referring to FIG. 2, for a given time, the measurement value for a beam scheduled in addition to the measurement in the existing measurement slot is added as a sample. In the remaining part, the above cases (A to H) described in the first embodiment are directly applied. The measurement value for the scheduled TX beam and associated RX beam and the measurement result for the BRS are added to the case of the first embodiment. When performing the calculation, the measurement value for the added pair of the TX beam and RX beam is added to the previous calculation result.

For example, a plurality of BRSs can be simultaneously transmitted and act as a synchronization signal (SS). A subset of the data TX beams of the base station can be simultaneously radiated for one SS transmission. In this case, the SS can be measured and the measurement result can be used to find a refined TX beam, and the control and data can be transmitted via the refined TX beam. Here, the reference signal indicating the PDCCH hypothesis transmission may be either the SS itself or the data TX beams constituting the SS.

Figure 3:
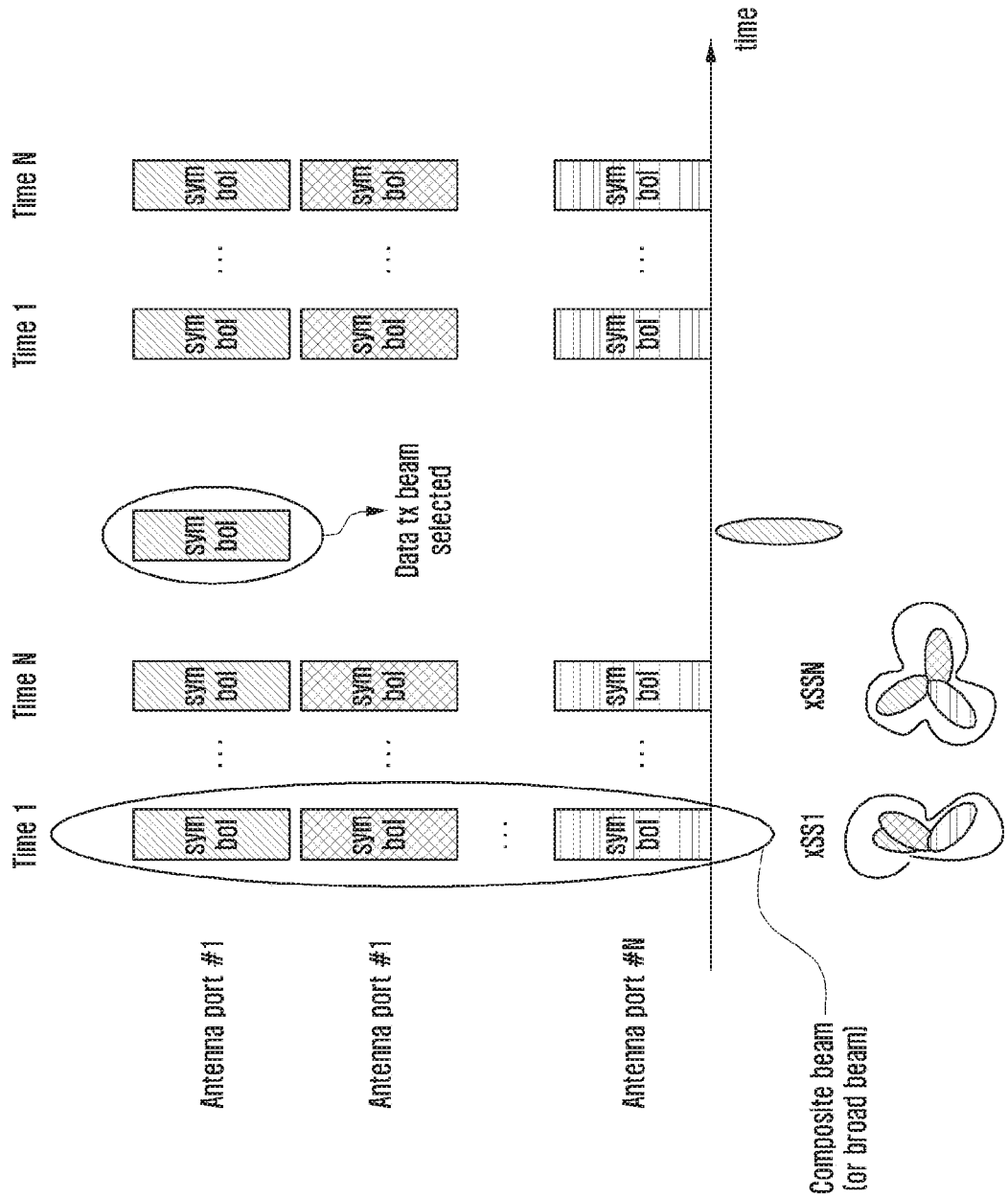
FIG. 3 illustrates transmission of a synchronization signal (SS) simultaneously using multiple data TX beams according to an embodiment of the disclosure.

FIG. 3 illustrates transmission of a synchronization signal (SS) simultaneously using multiple data TX beams according to an embodiment of the disclosure.

Referring to FIG. 3, the SS is transmitted as a composite beam using multiple data TX beams (e.g., three) simultaneously. The same synchronization signal is transmitted through these beams, and the terminal sees the same synchronization signal in the beam coverage. By measuring the SS transmitted through the composite beam, the terminal achieves timing synchronization with the cell. At the same time, the terminal performs measurement to find the data TX beam needed thereby in the composite beam.

Figure 4:
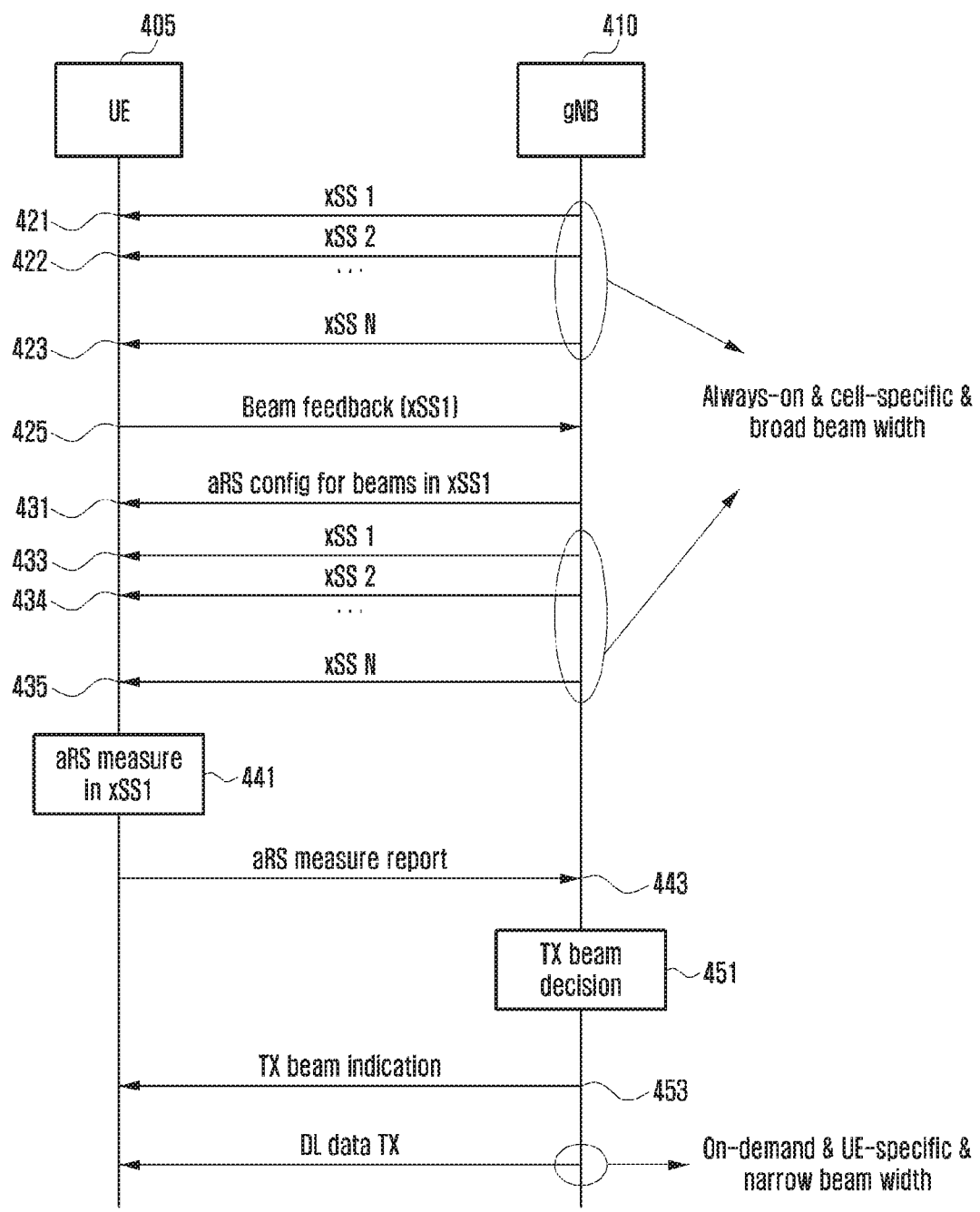
FIG. 4 illustrates a case where, for the report of the sequential SS measurement results, the base station configures a separate reference signal for the data TX beams constituting the corresponding SS and transmits the reference signal together with the configuration information to the terminal according to an embodiment of the disclosure.

FIG. 4 illustrates a case where, for the report of the sequential SS measurement results, the base station configures a separate reference signal for the data TX beams constituting the corresponding SS and transmits the reference signal together with the configuration information to the terminal according to an embodiment of the disclosure.

Referring to FIG. 4, the terminal 405 measures the SS in sequence (at operations 421, 422, 423), and reports the measurement result (e.g., the SS with the strongest received signal strength) to the base station 410 (at operation 425). The base station 410 configures a separate reference signal (referred to as an additional RS, abbreviated as "aRS") in the data TX beams forming the SS and transmits this information to the terminal 405 (at operation 431). Upon receiving the information, the terminal 405 measures the aRS in the SS (at operations 433, 434, 435) (operation 441), and reports the measurement result to the base station (at operation 443). The base station 410 determines the beam for data/control transmission (at operation 451). When the base station 410 transmits the determined beam indication to the terminal 405 (at operation 453), the terminal identifies the DL TX beam indicated by the beam indication. Then, the terminal 405 receives data/control information via the identified beam. In this process, one or both of the SS and the aRS may be used as a reference signal for in-sync (IS)/out-of-sync (OOS) determination. In the description, the terms "aRS" and "CSI-RS" may be interchangeably used.

If only the SS is configured, the SS can be used instead of the BRS in OOS determination in the first embodiment of the disclosure. The following shows the signaling of the required information when only the SS is used.

Next, the per-beam measurement is described in another perspective.

In LTE radio link monitoring, if the Q_out threshold is not exceeded for a duration T_out (=200 ms), an OOS indication is generated. In this case, since the RS is generated on a symbol basis in each subframe, the reception strength will be measured at different points in time and have different values measured for 200 ms. Since it is a UE implementation issue to have a certain value as the representative value, various options may be possible, but most of them will assume the average value for each symbol as the representative value. In the case of in-sync, an IS indication is generated if the Q_in threshold is exceeded for a duration T_in (=100 ms).

If the xSS is set as the target for RLM, the symbol position (time and frequency) of the xSS may be known in advance or may be notified by the network through a broadcast channel or a dedicated signal. Based on this information, the reception strength of the xSS is measured for each symbol. If it is known through the network information that the xSS symbols are transmitted via one specific beam, instead of unconditionally comparing the average value of the xSS symbols during T_out with the threshold, considering only the symbols transmitted via the corresponding beam, the terminal may regard it as an in-sync decision element if its value is larger than Q_in, and regard it as an out-of-sync decision element if its value is smaller than Q_out.

Figure 5:
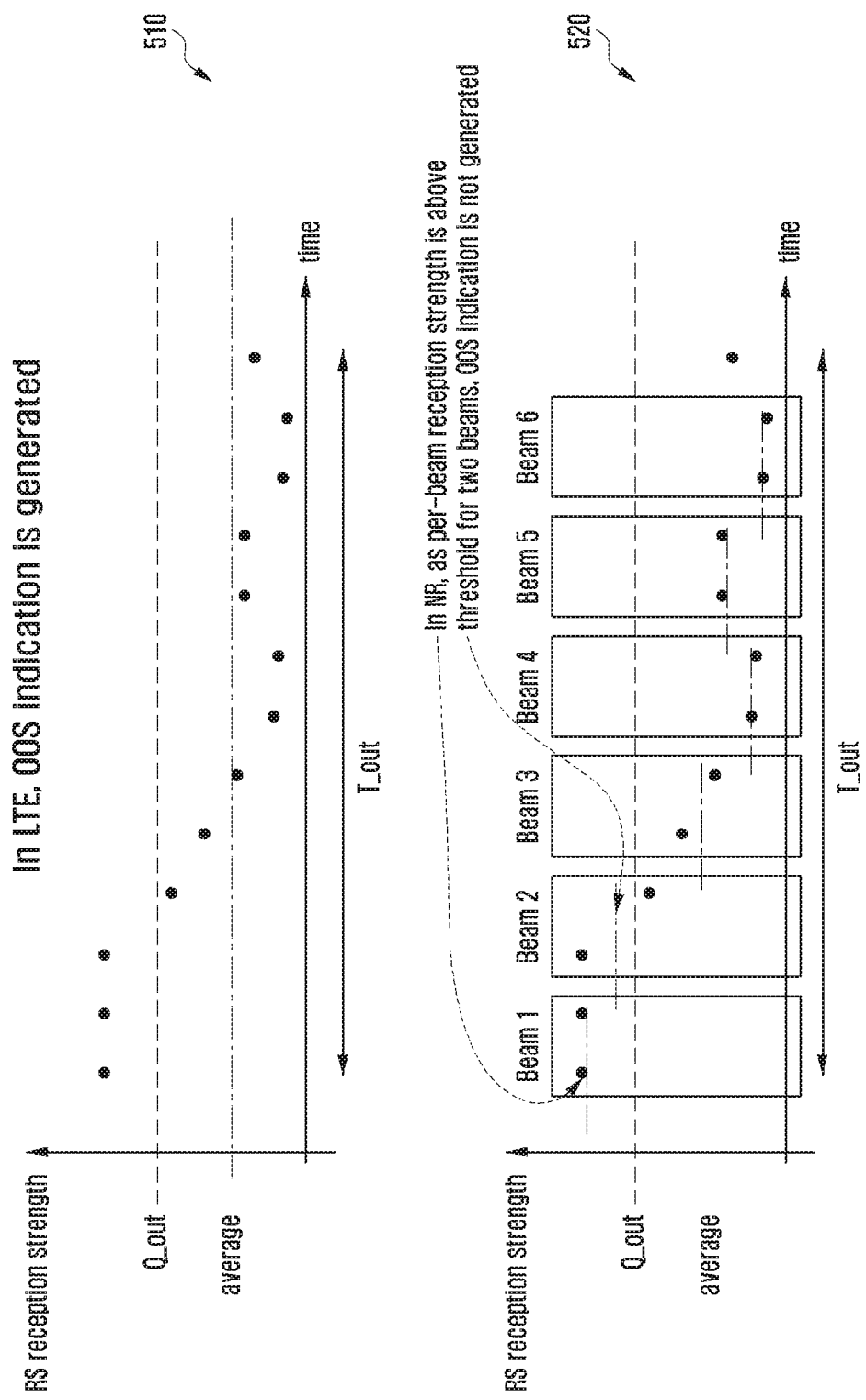
FIG. 5 illustrates the difference in radio link monitoring (RLM) operation between long term evolution (LTE) and new radio (NR) operating beams according to an embodiment of the disclosure.

FIG. 5 illustrates the difference in radio link monitoring (RLM) operation between LTE and NR (new radio) operating beams according to an embodiment of the disclosure.

Referring to FIG. 5, the difference in RLM operation between LTE and NR operating beams is illustrated. Reference symbol 510 indicates OOS determination in LTE, and reference symbol 520 indicates OOS determination in NR. Whether the terminal can identify the beam carrying the xSS is examined. If the terminal cannot identify such a beam, the base station should provide necessary information enabling the terminal to identify the beam. Here, xSSs transmitted by one xSS block or one xSS block set may be referred to as "per-beam xSSs".

Embodiment 2-1: Only the SS is the RLM Target

More specifically, the received signal strength of the xSSs transmitted by one beam is referred to as "reception strength of the per-beam xSSs". Here, the reception strength of the per-beam xSSs may be the average of reception strengths of the xSSs transmitted by one beam, a linear combination of reception strengths with specific weights, or an implementation-dependent value. To issue an out-of-sync (OOS) indication, the terminal determines whether the reception strength of the per-beam xSSs is greater or less than Q_out in consideration of all xSSs transmitted during T_out. If the reception strength of the per-beam xSSs is less than Q_out for all beams transmitted during T_out, the terminal issues an OOS indication to the higher layer. As another example, the network may set the value of N separately to issue an OOS indication if the reception strength of the per-beam xSSs is less than Q_out for N beams. Here, as the number of beams carrying the xSS may be different in different base stations, it is necessary to more flexibly perform OOS determination. In this regard, the base station can adaptively determine the value of T_out in relation to the number of operating beams.

Likewise, it is possible to issue an in-sync (IS) indication by use of the reception strength of the per-beam xSSs. To issue an IS indication, the terminal determines whether the reception strength of the per-beam xSSs is greater or less than Q_in in consideration of all xSSs transmitted during T_in. If the reception strength of the per-beam xSSs is greater than Q_in for any beam transmitted during T_in, the terminal issues an IS indication to the higher layer. As another example, the network may set the value of N separately to issue an IS indication if the reception strength of the per-beam xSSs is greater than Q_in for N beams. Here, as the number of beams carrying the xSS may be different in different base stations, it is necessary to more flexibly perform IS determination. In this regard, the base station can adaptively determine the value of T_in in relation to the number of operating beams.

Figure 6:
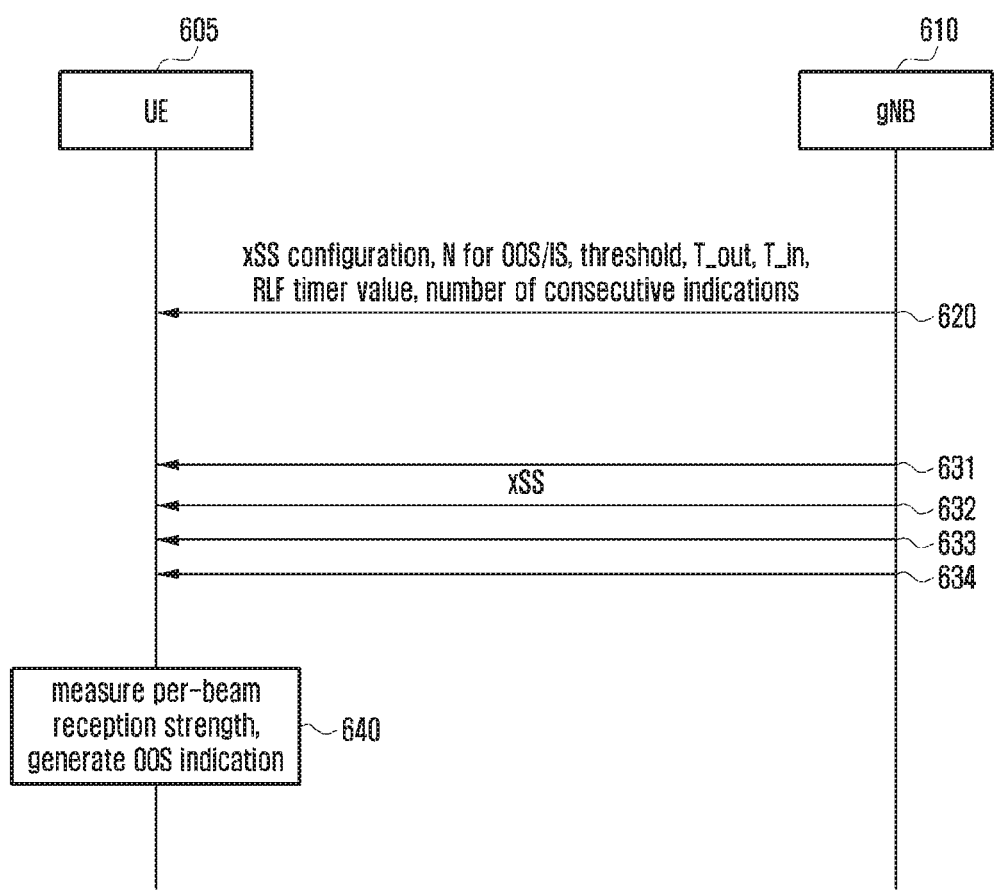
FIG. 6 depicts signaling between the terminal and the base station to utilize the xSS for radio link monitoring according to an embodiment of the disclosure.

FIG. 6 depicts signaling between the terminal and the base station to utilize the xSS for radio link monitoring according to an embodiment of the disclosure.

FIG. 6 depicts signaling of the base station to transmit parameters needed for utilizing the xSS for radio link monitoring.

At operation 620, the base station 610 may transmit parameters needed for RLM to the terminal 605. The base station 610 may notify the terminal 605 of SS configuration information and RLM/RLF parameters (number of beams needed for OOS and IS determination, threshold information needed for OOS and IS determination, duration required for generating one OOS indication (T_out), duration required for generating one IS indication (T_in), RLF timer value, number of consecutive OOS and IS indications required to start and stop the RLF timer). The base station 610 may notify the terminal 605 of the RLM/RLF parameters through system information, broadcast signaling, or UE dedicated signaling. The terminal 605 may have in advance at least one of the RLM/RLF parameters as a default value. For a RLM/RLF parameter that is not configured by the base station 610, the terminal 605 can use the corresponding default value. When a RLM/RLF parameter is newly configured, the terminal 605 can use the updated parameter.

The xSS configuration information may include the beam ID of a beam carrying an SS to be measured for RLM (or corresponding time, frequency, and resource information), or the SS location information on the time and frequency of the SS resource to be measured in the corresponding beam. T_out or T_in is the time duration required for generating one OOS or IS indication. N is used to specify the number of beams for a case where the measurement result is higher than the threshold among the per-beam measurement results during one T_out or T_in. That is, in the case of OOS determination, if the measurement result is above the threshold for N or more beams, this is not OOS. In the case of IS determination, if the measurement result is above the threshold for N or more beams, this is IS. The RLF timer value, and the number of consecutive OOS and IS indications required to start and stop the RLF timer may also be transmitted as a parameter. If the xSSs belong to a band of one numerology, the necessary information can be transmitted at once without additional configuration in the connected state as shown in FIG. 6. When the xSSs span a band with multiple numerologies with respect to the cell, if the terminal 605 can access a limited number of bandwidth parts (BWP) at a time and the BWPs can have different numerologies, the parameters described above for the active BWP assigned to the terminal 605 may be transmitted via a UE dedicated message. The base station 610 transmits xSSblock signals to the terminal 605 (at operations 631, 632, 633, 634).

Specifically for the thresholds, the base station can transmit the terminal a threshold value (RSRP, RSRQ, signal-to-interference-plus-noise ratio (SINR), or RSSI) corresponding to a given BLER for the measurement result of the RS to measure the xSSblock signals specified for hypothetical PDCCH transmission at the physical layer. Alternatively, the target BLER for a hypothetical PDCCH transmission can be delivered to the terminal. Upon receiving this value, as the terminal is aware of the relationship between the xSSblock signal measurement value and the given BLER, the terminal measures the xSSblock with respect to the given BLER to generate an OOS or IS indication (at operation 640). Additionally, the base station may deliver a randomly selected threshold or BLER value, or may deliver a value selected from a pre-defined set of threshold or BLER values.

In this case, the OOS indication and the IS indication can be generated independently according to their conditions. There may be a minimum time gap between OOS/IS indications due to UE signaling overhead or implementation difficulty.

Embodiment 2-2: The CSI-RS Becomes the RLM Target

If the CSI-RS is used for radio link monitoring, the received signal strength of the CSI-RSs included in the beam carrying the CSI-RS instead of the xSS is compared with the threshold for OOS or IS determination. Here, the CSI-RS may be terminal specific or cell specific. In any case, the base station must transmit the CSI-RS configuration information to the terminal. The CSI-RS configuration may be periodic or aperiodic event driven. The terminal should know whether the configured CSI-RS belongs to a specific beam. If the terminal knows the mapping between the beam and the CSI-RS, the terminal may consider the reception strength of the per-beam CSI-RSs as in the case of the xSS described before. Here, the reception strength of the per-beam CSI-RSs corresponds to the average (or, linear combination) of the received signal strengths of the CSI-RSs transmitted by the corresponding beam.

To issue an out-of-sync (OOS) indication, the terminal determines whether the reception strength of the per-beam CSI-RSs is greater or less than Q_out in consideration of all CSI-RSs transmitted during T_out. If the reception strength of the per-beam CSI-RSs is less than Q_out for all beams transmitted during T_out, the terminal issues an OOS indication to the higher layer. As another example, the network may set the value of N separately to issue an OOS indication if the reception strength of the per-beam CSI-RSs is less than Q_out for N beams. Here, as the number of beams carrying the CSI-RS may be different in different base stations, it is necessary to more flexibly perform OOS determination. In this regard, the base station can adaptively determine the value of T_out in relation to the number of operating beams.

Figure 7:
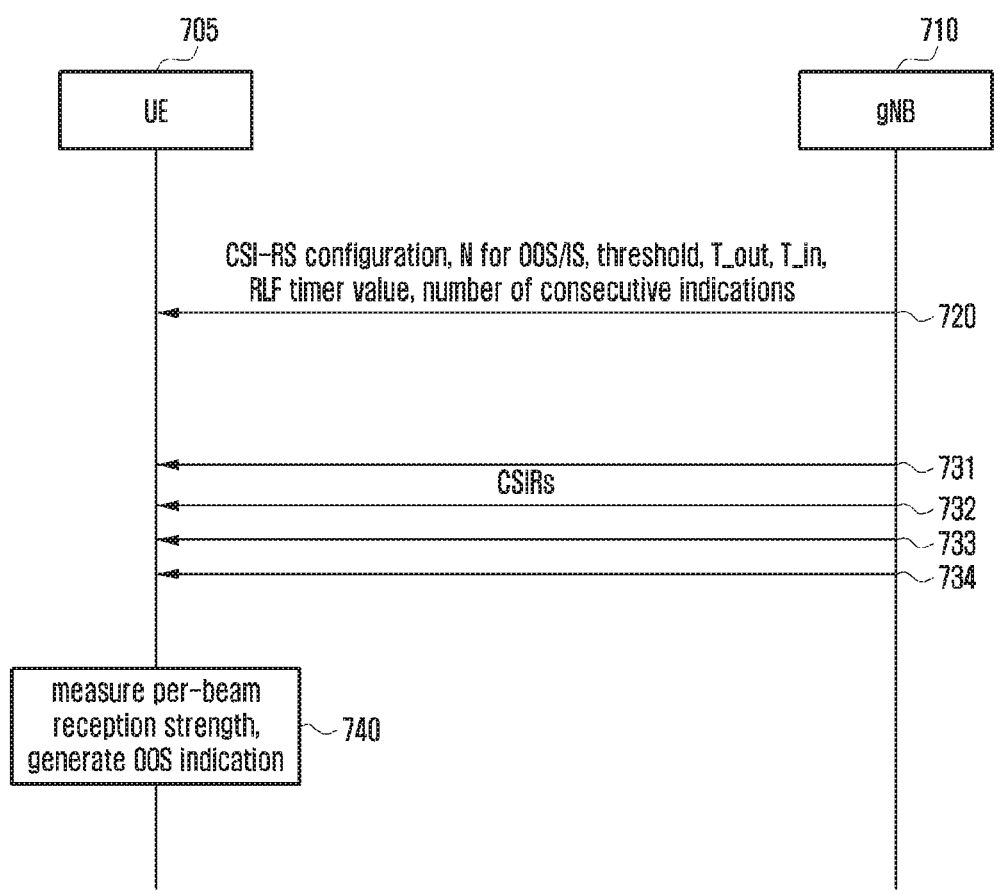
FIG. 7 depicts a case where the T_in value is adaptively managed with respect to the number of operating beams according to an embodiment of the disclosure.

Likewise, it is possible to issue an in-sync (IS) indication by use of the reception strength of the per-beam CSI-RSs. To issue an IS indication, the terminal determines whether the reception strength of the per-beam CSI-RSs is greater or less than Q_in in consideration of all CSI-RSs transmitted during T_in. If the reception strength of the per-beam CSI-RSs is greater than Q_in for any beam transmitted during T_in, the terminal issues an IS indication to the higher layer. As another example, the network may set the value of N separately to issue an IS indication if the reception strength of the per-beam CSI-RSs is greater than Q_in for N beams. Here, as the number of beams carrying the CSI-RS may be different in different base stations, it is necessary to more flexibly perform IS determination. In this regard, the base station can adaptively determine the value of T_in in relation to the number of operating beams as shown in FIG. 7. To this end, information on the RLF timer value and the number of consecutive OOS and IS indications required to start and stop the RLF timer may be delivered as a parameter.

FIG. 7 depicts a case where the T_in value is adaptively managed with respect to the number of operating beams according to an embodiment of the disclosure. In particular, whenever the UE specific CSI-RS is newly configured, the base station may notify the RLM-related parameters together with the CSI-RS configuration information. At operation 720, the base station 710 may transmit parameters needed for RLM to the terminal 705.

Referring to FIG. 7, when the CSI-RS is configured, the base station 710 notifies the terminal 705 of the CSI-RS configuration information (ID of configured CSI-RS, or beam time-frequency information and resource location information) and RLM/RLF parameters (number of beams needed for OOS and IS determination, threshold information needed for OOS and IS determination, duration required for generating one OOS indication (T_out), duration required for generating one IS indication (T_in), RLF timer value, number of consecutive OOS and IS indications required to start and stop the RLF timer). The base station 710 may notify the terminal 705 of the RLM/RLF parameters through system information, broadcast signaling, or UE dedicated signaling. The terminal 705 may have in advance at least one of the RLM/RLF parameters as a default value. For a RLM/RLF parameter that is not configured by the base station 710, the terminal 705 can use the corresponding default value. When a RLM/RLF parameter is newly configured, the terminal 705 can use the updated parameter. If the terminal 705 can access a limited number of bandwidth parts (BWP) at a time, the BWPs can have different numerologies, and different CSI-RS settings may be given accordingly. The parameters described above for the active BWP assigned to the terminal 705 may be transmitted via a UE dedicated message. That is, in FIG. 7, if the CSI-RS configuration changes in the same BWP, it may be applied at the time of reconfiguration. If the CSI-RS is configured to use another BWP, the information given in FIG. 7 may be carried by a message notifying the corresponding BWP. Alternatively, if the CSI-RS is configured to use another BWP, the information given in FIG. 7 may be carried by a dedicated message after the terminal accesses the corresponding BWP. The base station 710 transmits CSI-RSs to the terminal 705 (at operations 731, 732, 733, 734).

Specifically for the thresholds, the base station 710 can transmit the terminal 705 a threshold value (RSRP, RSRQ, SINR, or RSSI) corresponding to a given BLER for the measurement result of the RS to measure the CSI-RS signals specified for hypothetical PDCCH transmission at the physical layer. Alternatively, the target BLER for a hypothetical PDCCH transmission can be delivered to the terminal 705. Upon receiving this value, as the terminal 705 is aware of the relationship between the CSI-RS measurement value and the given BLER, the terminal measures the CSI-RSs with respect to the given BLER to generate an OOS or IS indication (740). Additionally, the base station 710 may deliver a randomly selected threshold or BLER value, or may deliver a value selected from a pre-defined set of threshold or BLER values.

In the case where only the aRS is used, since the aRS does not occur for a uniform period of time, the aRS is measured when downlink transmission occurs and the corresponding beam is received. Regardless of the number of samples, if the time-average reception strength during the most recent time period does not exceed the OOS threshold, an OOS indication is issued; and if it exceeds the IS threshold, an IS indication is issued.

Embodiment 2-2: Both SS and CSI-RS are Used for RLM

The RLM/RLF parameters may be different for RSs

For the SS, since OOS/IS must be determined through beam sweeping with a wide beam in all directions, the T_out/T_in time window will be larger than that for the CSI-RS using a narrow beam. The CSI-RS beam is not any available narrow beam but is a small number of beams allocated by the base station to the data and control channels, so that T_out/T_in for the CSI-RS is often small depending on the number of beams. As an opportunity to check whether the current situation is in-sync or out-of-sync, the T_out/T-in time window can be different for the SS and the CSI-RS during the same time period. When the channel condition becomes poor, considering the same number of times of waiting for the SS or the CSI-RS, the RLF time value will be large for the SS and be small for the CSI-RS.

When the two RSs issues the same indication to the RRC (i.e., N is considered only between RSs of the same type):

Both the xSS and the CSI-RS may be used for radio link monitoring at the same time. In this case, RS configuration information and the OOS/IS threshold can be set separately for the xSS and the CSI-RS. The values of T_out, T_in, and N in OOS/IS determination may be set separately or may be set as one value for the xSS and the CSI-RS. The timer value or the number of consecutive indications can also be set separately for the xSS and the CSI-RS. If all parameter values are set separately for the xSS and the CSI-RS, the OOS/IS indication can be generated independently of the RS. Here, when the RLF timer is activated in the RRC, this indication is recognized as the same indication regardless of the RS. In other words, if an OOS indication is generated first from the xSS and another OOS indication is generated next from the CSI-RS, the RRC may regard the two OOS indications as the same type of indication and recognize them as consecutive OOS indications as in the case of LTE N310. Likewise, even if IS indications occur from separate settings, the RRC may recognize them as the same type of indication.

When the two RSs issues a unified indication to the RRC (i.e., N is considered from a unified RS perspective):

For OOS handling, the values of T_out, T_in, and N in OOS/IS determination may be set in a unified way for the xSS and the CSI-RS. In this case, considering both the CSI-RS beam and the xSS beam received during T_out, if the reception strength of the per-beam RSs (here, RS can be xSS or CSI-RS) for N beams is less than Q_out, an OOS indication is generated. Here, the OOS threshold can be set separately for the xSS and the CSI-RS, and the values of N and T_out are the same regardless of the RS type.

For IS handling, the values of T_out, T_in, and N in OOS/IS determination may be set in a unified way for the xSS and the CSI-RS. In this case, considering both the CSI-RS beam and the xSS beam received during T_in, if the reception strength of the per-beam RSs (here, RS can be xSS or CSI-RS) for N beams is greater than Q_in, an IS indication is generated. Here, the IS threshold can be set separately for the xSS and the CSI-RS, and the values of N and T_in are the same regardless of the RS type.

a. Averaging Measurement Values of Two RSs Before OOS/IS Determination

If both the SS and the aRS are used, the SS sample is accumulated using the BRS OOS determination method of the disclosure, and the aRS sample is further accumulated to the cumulative SS value when the aRS is transmitted and measured. Here, for accumulation, the measurement value for the aRS is linearly combined with the cumulative value for the SS.

Prioritization when multiple RSs are configured simultaneously

If two RSs are configured for RLM, the network can signal which RS has priority. Then, an OOS or IS indication can be sent to the RRC according to the measurement result for the RS having priority at the time of signaling. Alternatively, without giving priority to a particular RS, it is possible to send an OOS or IS indication to the RRC by referring to the measurement result for one RS depending upon the measurement result for the other RS. Such a hierarchical scheme is described below.

1) Giving Priority to OOS Determination for SS

As another way to use the SS and the aRS together, it is possible to make a hierarchical decision. If it is determined to be OOS on the basis of measurement values for the SS only, an OOS indication is sent to the RRC without further consideration of the aRS. If it is determined to be IS on the basis of measurement values for the SS only, measurement values for the aRS are further considered. That is, if the measurement result for the aRS is less than or equal to the given threshold, an OOS indication is sent to the RRC and otherwise an IS indication is sent to the RRC. In this case, the measurement values for the aRS are linearly combined with each other, and the measurement values for the SS are accumulated between the SS measurement values as in the first BRS OOS determination scheme of the disclosure.

2) Giving Priority to IS Determination for SS

If it is determined to be IS on the basis of measurement values for the SS only, an IS indication is sent to the RRC without further consideration of the aRS. If it is determined to be OOS on the basis of measurement values for the SS only, measurement values for the aRS are further considered. That is, if the measurement result for the aRS is less than or equal to the given threshold, an OOS indication is sent to the RRC and otherwise an IS indication is sent to the RRC. In this case, the measurement values for the aRS are linearly combined with each other, and the measurement values for the SS are accumulated between the SS measurement values as in the first BRS OOS determination scheme of the disclosure.

3) Giving Priority to OOS Determination for CSI-RS

If it is determined to be OOS on the basis of measurement values for the CSI-RS only, an OOS indication is sent to the RRC without further consideration of the SS. If it is determined to be IS on the basis of measurement values for the CSI-RS only, measurement values for the SS are further considered. That is, if the measurement result for the SS is less than or equal to the given threshold, an OOS indication is sent to the RRC and otherwise an IS indication is sent to the RRC. In this case, the measurement values for the aRS are linearly combined with each other, and the measurement values for the SS are accumulated between the SS measurement values as in the first BRS OOS determination scheme of the disclosure.

4) Giving Priority to IS Determination for CSI-RS

If it is determined to be IS on the basis of measurement values for the CSI-RS only, an IS indication is sent to the RRC without further consideration of the SS. If it is determined to be OOS on the basis of measurement values for the CSI-RS only, measurement values for the SS are further considered. That is, if the measurement result for the SS is less than or equal to the given threshold, an OOS indication is sent to the RRC and otherwise an IS indication is sent to the RRC. In this case, the measurement values for the aRS are linearly combined with each other, and the measurement values for the SS are accumulated between the SS measurement values as in the first BRS OOS determination scheme of the disclosure.

5) Indexing Scheme

For the hierarchical method described above, an index may be assigned to each combination in advance and the network may specify a corresponding rule. Such an example is shown in Table 1 below.

TABLE 1

| Index | Result | 1st check | 2nd check | Example |
|---|---|---|---|---|
| 1 | OOS | SS OOS | CSI-RS OOS | 5-1 |
| 2 | IS | SS IS | CSI-RS IS | 5-2 |

If the 1st check for a particular RS produces the indicated outcome, an OOS indication is unconditionally generated. If the 1st check does not produce the indicated outcome, the 2nd check is considered. If the 2nd check produces the indicated outcome, an OOS indication is generated again. Otherwise, the complementary result of being OOS is generated. When the base station delivers this information, the terminal determines the cell-wise RLM result based on the RLM results of the two RSs by use of the received information and notifies the cell-wise RLM result to the RRC.

6) Delivering Offset as Threshold when Two RSs Simultaneously Configured

When two RSs are used simultaneously, the threshold for each RS may be an absolute value. However, it is also possible that one threshold is an absolute value and the other threshold is an offset value.

When the base station transmits the terminal a parameter set corresponding to each RS, thresholds may be given as an absolute value. If the threshold for one RS is already given, the threshold for the other RS may be provided as an offset relative to the threshold already given. For example, when the aRS and the SS are used simultaneously, they are different in beam width and number of component beams. Hence, to add a measurement value for the aRS reception beam to a measurement value for the SS reception beam, or to make a determination based on a specific threshold, an offset to be added to the received signal strength may be needed. This offset can be added to a measurement value for the aRS to generate a received signal strength value for the SS serving as a unified metric. This unified metric may be compared with the given threshold. To this end, the base station may deliver a necessary offset value to the terminal.

Figure 8:
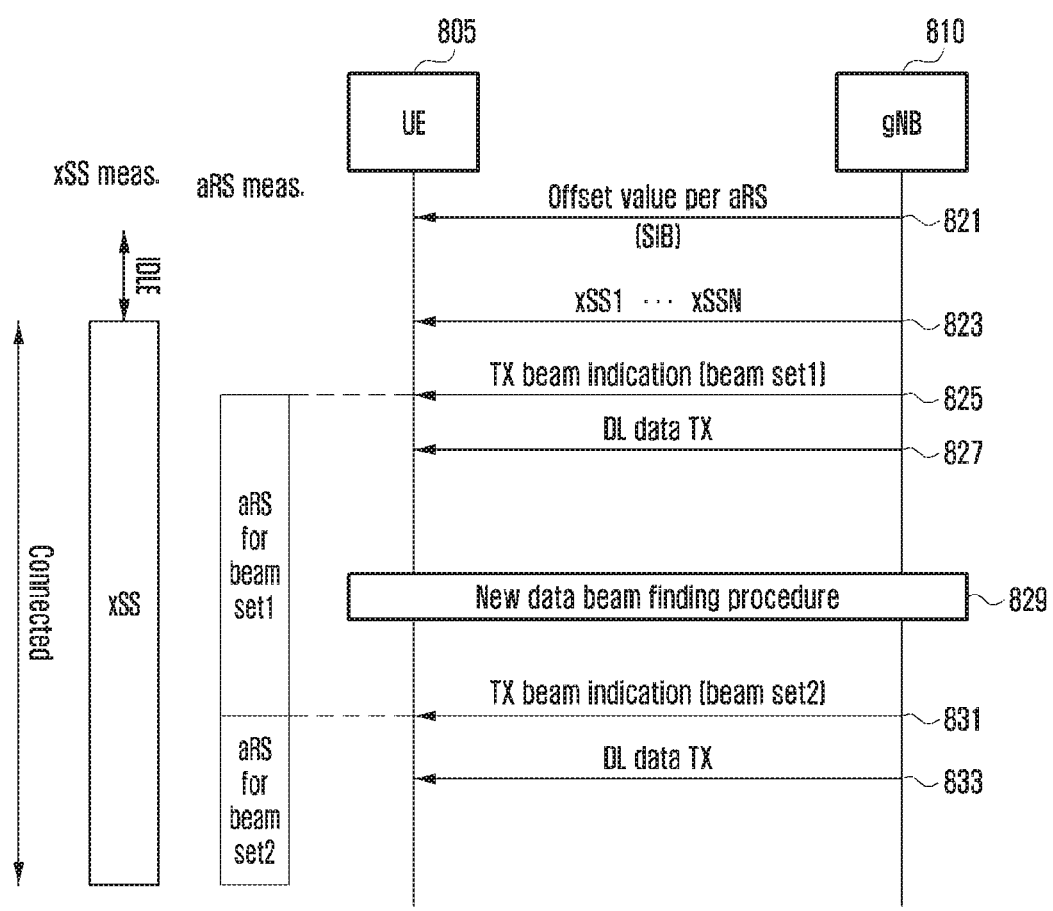
FIG. 8 depicts a case where the base station transmits information on the offset value set for a specific DL TX beam as system information and the terminal uses this information whenever a DL TX beam set is configured according to an embodiment of the disclosure.

FIG. 8 depicts a case where the base station transmits information on the offset value set for a specific DL TX beam as system information and the terminal uses this information whenever a DL TX beam set is configured according to an embodiment of the disclosure.

Referring to FIG. 8, an offset value is set for a specific DL TX beam, the base station 810 transmits the offset information as system information, and the terminal 805 applies this information whenever a DL TX beam set is configured. The base station 810 transmits the offset value as system information to the terminal 805 (at operation 821), and the base station 810 transmits the SSs in time or frequency sequence in always-on mode (at operation 823). When the terminal 805 measures the SSs and reports the best SS to the base station 810, the base station 810 configures an aRS at the DL TX beams constituting the best SS and transmits aRS location information to the terminal 805 (at operation 825).

The terminal 805 performs measurement based on this information and transmits the measurement result to the base station 810. Then, the base station selects the DL TX beam (at operation 827). Here, when the number of beams selected for DL transmission and the corresponding beam IDs are known, it is possible to identify the offset value to be applied when a particular beam is measured. After finding a new beam (at operation 829), if the DL TX beam is changed (at operation 831) while calculating the aRS metric, based on the corresponding indication, the target for aRS metric calculation should be changed from beam set 1 to beam set 2 (at operation 833).

Table 2 below shows an example of representing such related information.

TABLE 2

| The number of selected | xSS1 | | xSS2 | |
|---|---|---|---|---|
| | beam ID | | | |
| Tx beams | 1 | 2 | 3 | 4 |
| 1 | −10 dBm | −10 dBm | −10 dBm | −10 dBm |
| 2 | −5 dBm | −5 dBm | −5 dBm | −5 dBm |
| 3 | −3 dBm | −3 dBm | −3 dBm | −3 dBm |
| 4 | 0 dBm | 0 dBm | 0 dBm | 0 dBm |

When two DL TX beams (beam 1 and beam 2) are selected, the value obtained by adding −5 dBM to a measurement value for beam 1 or beam 2 may be linearly combined with a measurement value for the SS.

As another example of signaling, the above information can be delivered through an RRC dedicated message.

Figure 9:
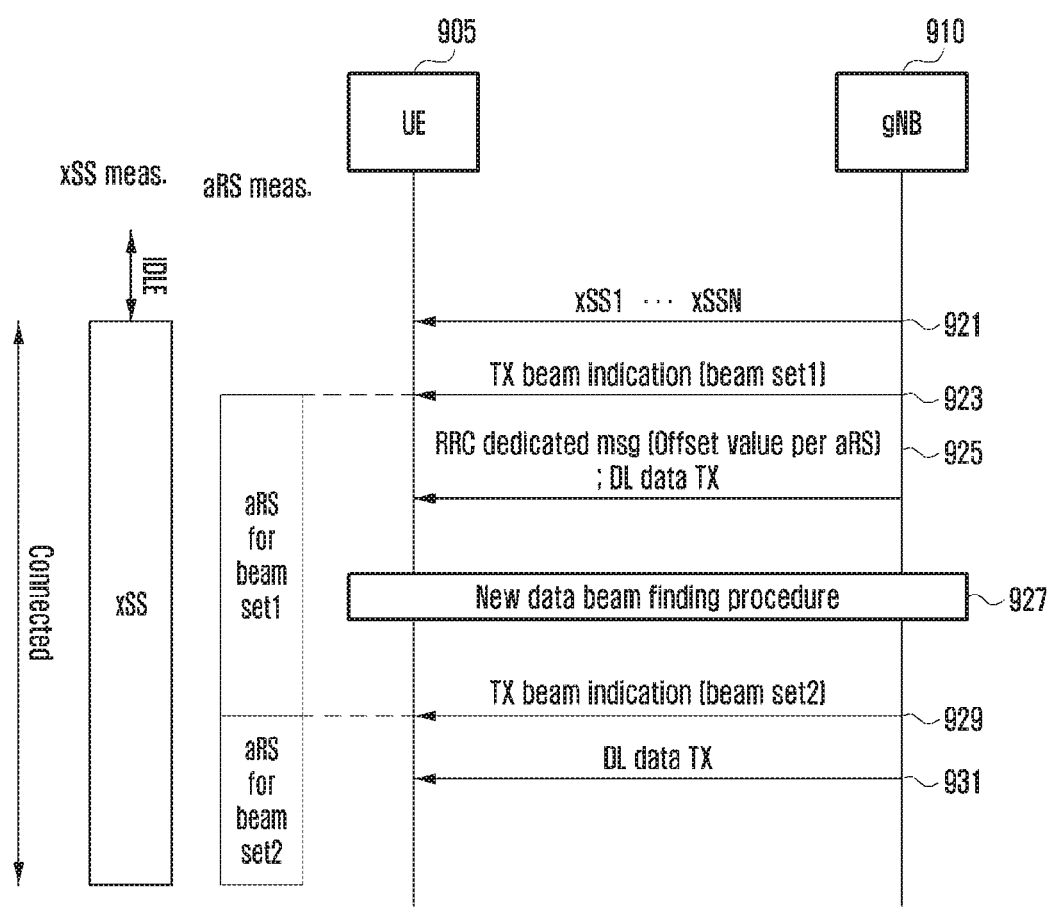
FIG. 9 depicts a case where beam offset information is transmitted through a radio resource control (RRC) dedicated message according to an embodiment of the disclosure.

FIG. 9 depicts a case where beam offset information is transmitted through an RRC dedicated message according to an embodiment of the disclosure.

The base station 910 may transmit the offset information, which is transmitted via system information in FIG. 8, via an RRC dedicated message, and the terminal 905 applies this information. Since the best SS has already been determined, offset values for the DL TX beams corresponding to the best SS can be transmitted. For example, if SS1 is selected and reported as the best SS, the base station may provide offset values for the DL TX beams corresponding to SS1 as shown in Table 3 below. For operations 921 to 931 except for operation 925, refer to the corresponding operations in FIG. 8.

TABLE 3

| The number of selected | xSS1 | |
|---|---|---|
| | beam ID | |
| Tx beams | 1 | 2 |
| 1 | −10 dBm | −10 dBm |
| 2 | −5 dBm | −5 dBm |
| 3 | −3 dBm | −3 dBm |
| 4 | 0 dBm | 0 dBm |

Figure 10:
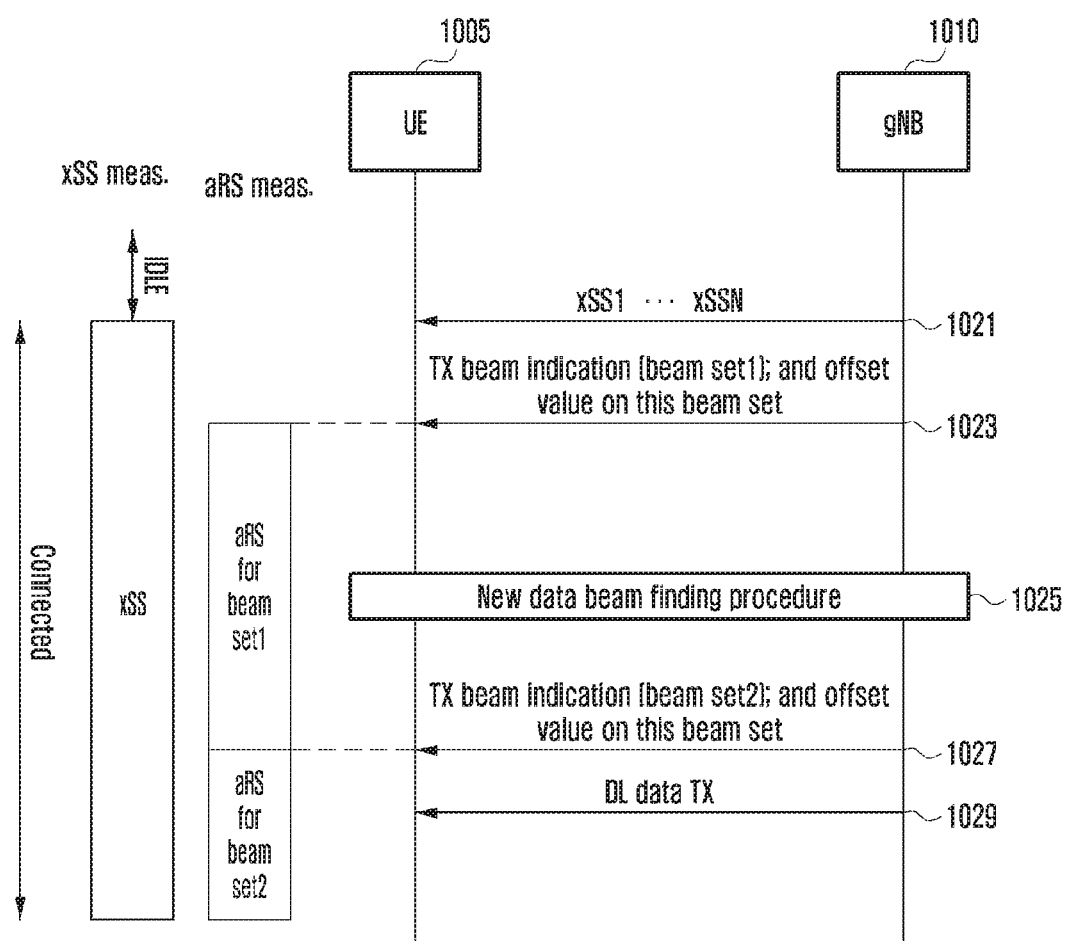
FIG. 10 depicts a case where related offset information is transmitted through a physical-layer control channel according to an embodiment of the disclosure.

FIG. 10 depicts a case where related offset information is transmitted through a physical-layer control channel according to an embodiment of the disclosure.

Referring to FIG. 10, this embodiment can send offset information faster than other layers. For example, the base station 1010 may notify the terminal 1005 of the selected DL TX beam through the PDCCH, and may further transmit an offset for each beam (at operation 1023). In this case, since the base station may know the selected DL TX beams, it does not have to transmit the offset information through downlink transmissions related to other SSs. In addition, if the DL TX beam set is changed, the base station can quickly transmit necessary offset information (at operation 1027). For operations 1021, 1025 and 1029, refer to the corresponding operations in FIG. 8.

Figure 11:
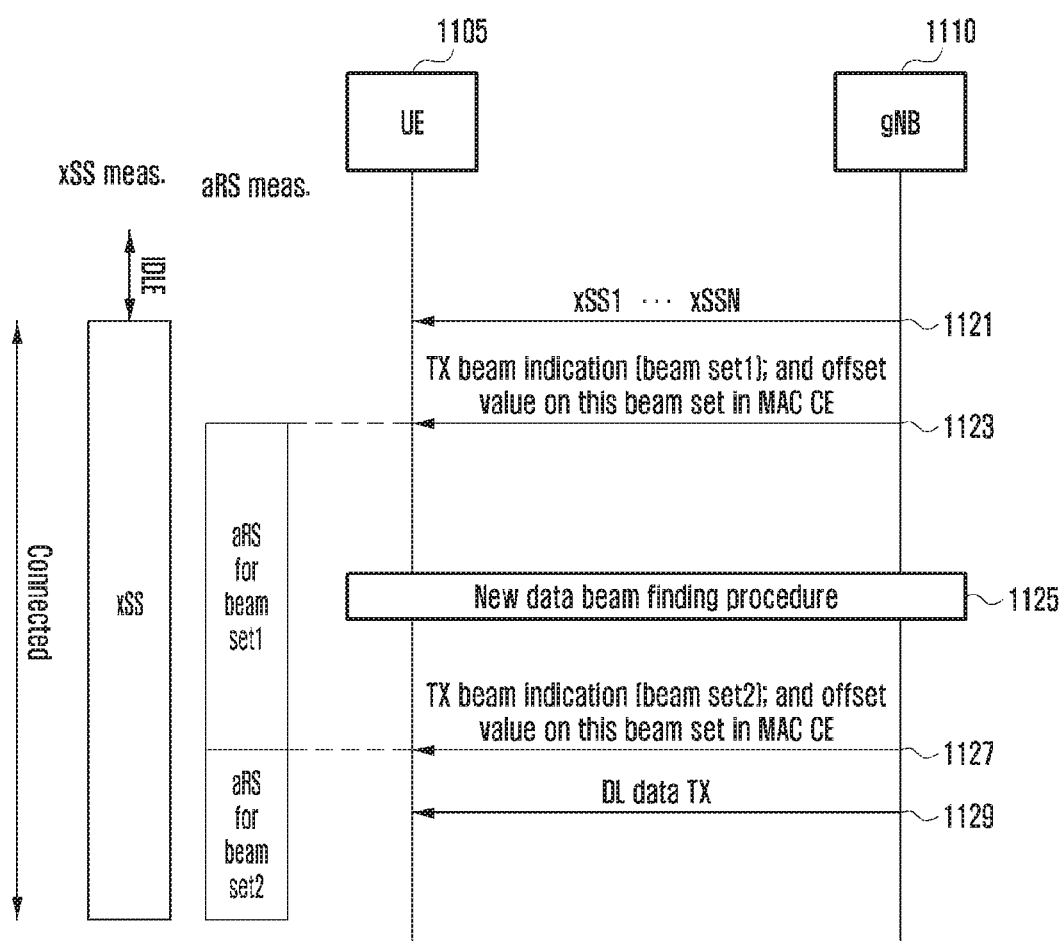
FIG. 11 depicts a case where related offset information is transmitted through a medium access control (MAC) control element (CE) according to an embodiment of the disclosure.

As another option, FIG. 11 depicts a case where related offset information is transmitted through a MAC (medium access control) CE (control element) according to an embodiment of the disclosure.

Referring to FIG. 11, the base station 1110 transmits related offset information to the terminal 1105 through a MAC CE (at operations 1123, 1127). When notifying the DL TX beam, the offset value associated with the number and IDs of the selected DL TX beams can be notified via a MAC CE. For operations 1121, 1125 and 1129, refer to the corresponding operations in FIG. 8.

When only one of the SS and the CSI-RS is the target of RLM, the parameter set for each RS can be transmitted through system information or through dedicated signaling. When most terminals can perform RLM using the CSI-RS and the SS and their terminal capabilities can support the two RSs, information transmission overhead can be reduced by use of system information.

However, a particular terminal may report a measurement result for only one of the two RSs. If a particular bandwidth part can carry only the CSI-RS (without the SS), a terminal operating in that bandwidth part may need information only about the CSI-RS. The CSI-RS configuration information assigned to the active bandwidth part and the threshold information required for RLM can also be changed by different numerologies. The bandwidth part used by a terminal may change with time. In these cases, the base station may use UE dedicated signaling to transmit the CSI-RS configuration information at the time when the corresponding bandwidth part is used as described in subsection 2) and information regarding the value of N in OOS/IS determination, thresholds (absolute value or offset), T_out, T_in, RLF timer value, and the number of consecutive indications.

7) Applying RLF Parameters when the RSs are Simultaneously Configured

The RLF timer can be started or stopped when consecutive OOS or IS indications are sent from the physical layer (PHY) to the RRC. If only one RS is configured, or if only one RS has priority over time without change although two RSs are configured, RLM and RLF operations may be performed by inheriting the RLF parameters of the corresponding RS. However, when plural RSs are configured, if the RLM RS is changed from the previous RS to a new RS, it is necessary to determine whether to apply the RLF parameters associated with the new RS after inheriting the state of the RLF parameters associated with the previous RS, or whether to apply the RLF parameters associated with the new RS after resetting the state of the RLF parameters associated with the previous RS.

To this end, the RRC needs to know the RS causing the OOS or IS indication. As one option, the PHY may send an OOS or IS indication having a RS mark. That is, the PHY may transmit a SS OOS or IS indication to the RRC, and when the CSI-RS is configured, it may transmit a CSI-RS OOS or IS indication to the RRC. As another option, without a RS mark, the RRC may recognize the OOS or IS indication, which is received from the PHY after the time when the RS having priority is configured according to a preset prioritization rule, as being associated with the RS with priority.

Figure 12:
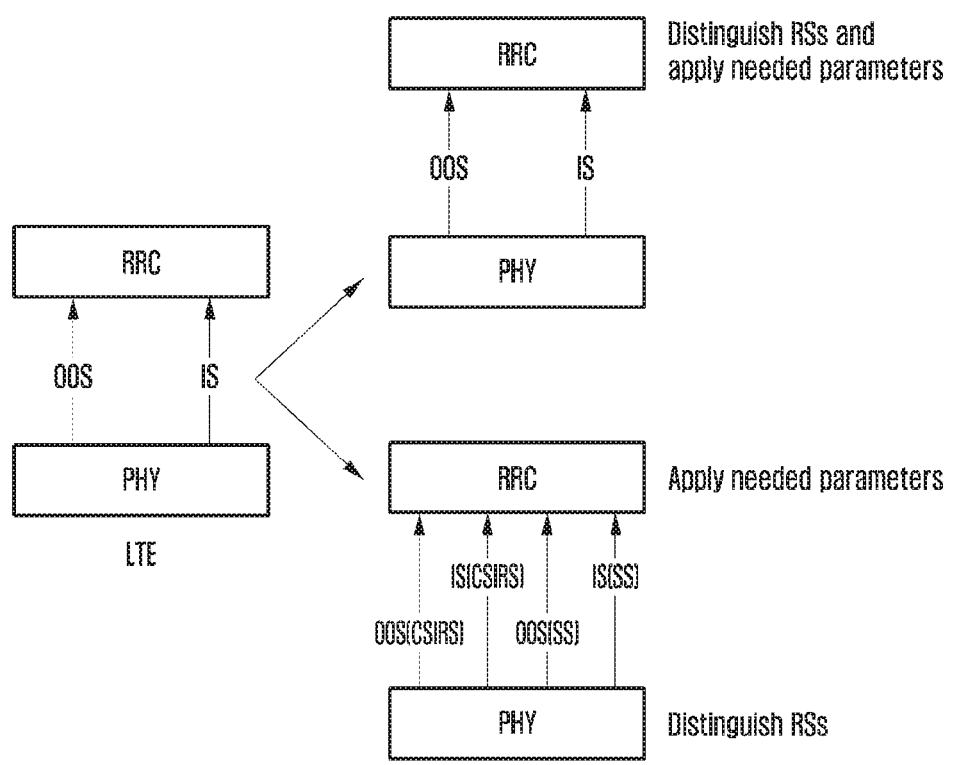
FIG. 12 illustrates a scheme where the physical layer provides a per-RS indication or an aggregate indication to the higher layer (RRC) according to an embodiment of the disclosure.

FIG. 12 illustrates a scheme where the physical layer provides a per-RS indication or an aggregate indication to the higher layer (RRC) according to an embodiment of the disclosure.

Referring to FIG. 12, the physical layer may provide a per-RS indication or an aggregate indication to the higher layer (RRC). When the per-RS indication is used, the PHY performs RLM for all RSs regardless of priority and sends each indication with a RS mark to the higher layer, and the RRC checks the RS mark and applies the RLF parameters associated with the RS with priority. When the aggregate indication is used, the PHY performs RLM only for the RS with priority, and the RRC may recognize the indication, which is received after the time when the RS having priority is configured, and applies the RLF parameters associated with the RS with priority.

If the RRC distinguishes the indication in the above method, the corresponding RLF parameters can be applied as follows.

Condition for applying different RLF parameters

In the terminal, there may be a case where the CSI-RS is IS and the associated SS is not always IS.

Figure 13:
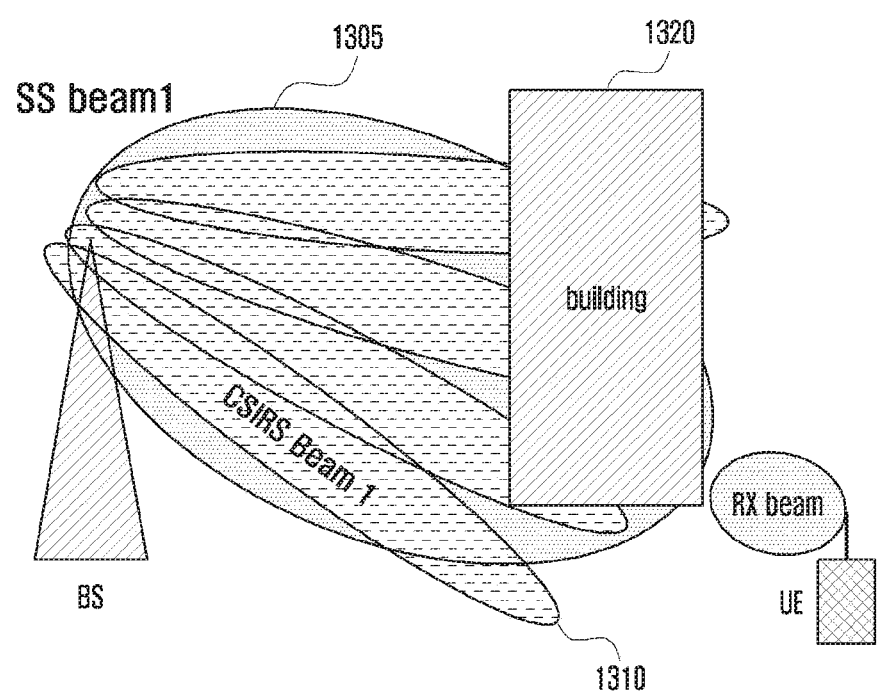
FIG. 13 illustrates a case where the channel state information-reference signal (CSI-RS) is in-sync (IS) for the terminal but the related SS is not in-sync according to an embodiment of the disclosure.

FIG. 13 illustrates a case where the CSI-RS is IS for the terminal but the related SS is not IS according to an embodiment of the disclosure.

Referring to FIG. 13, although most of the wide beam 1305 carrying the SS is blocked by the building 1320, one narrow beam 1310 of the wide beam may be not blocked by the building 1320. In such a case, the reception strength of the SS may be quite low, but CSI-RS beam 1 may not have a problem at all. Hence, it is necessary to examine the channel state independently for each RS. This case will be solved by resetting the parameters between RSs.

On the other hand, the remaining CSI-RS beams share the same channel state (OOS) as the SS, and T_IS for SS IS determination will be longer than T_IS for CSI-RS IS determination. Hence, it is meaningful to make an in-sync determination if the required number of IS indications is met. Upon determining that the correlation between the received signal strengths of the SS beam and the CSI-RS beam is high based on the existing beam measurement values, the network may instruct the terminal to inherit the state of the existing parameters. Upon determining that the above correlation is not high and the service is not delay sensitive, the network may instruct the terminal to reset the state of the existing parameters.

Number of consecutive indications

There is the number of consecutive indications among the RLF parameters for each RS. When the CSI-RS is configured at a specific point in time while performing RLM with respect to the SS, it can be assumed that a policy for giving priority to the CSI-RS is set at that point in time.

Figure 14:
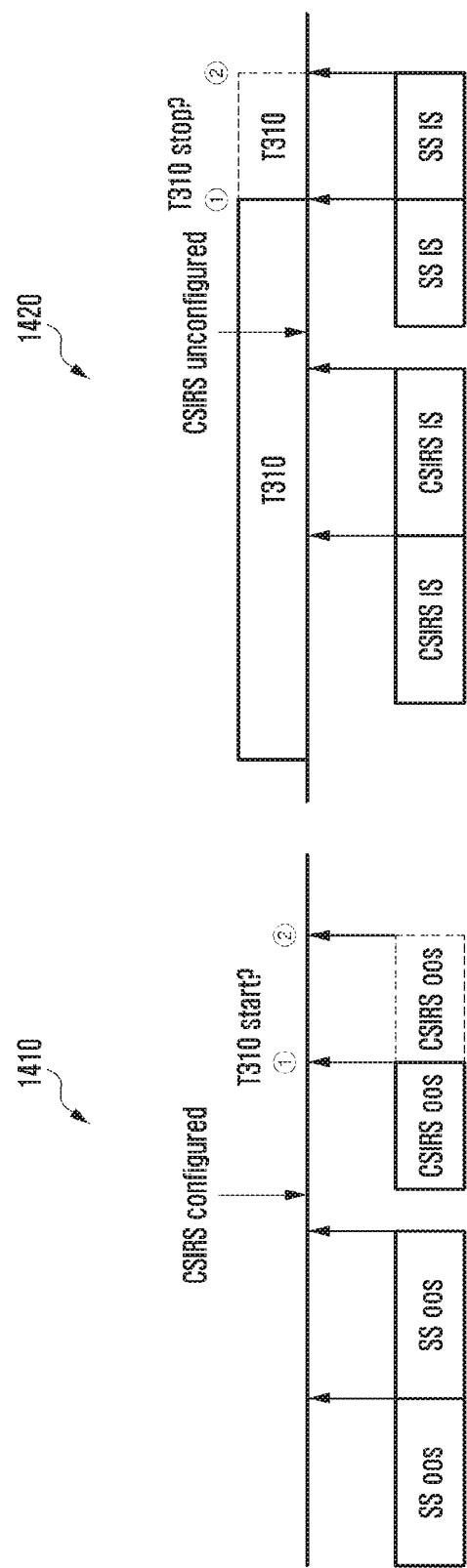
FIG. 14 illustrates a policy that, when the CSI-RS is configured at a specific point in time while performing RLM through the SS, RLM is performed with priority given to the CSI-RS according to an embodiment of the disclosure.

FIG. 14 illustrates a policy that, when the CSI-RS is configured at a specific point in time while performing RLM through the SS, RLM is performed with priority given to the CSI-RS according to an embodiment of the disclosure.

Referring to FIG. 14, for the scenario indicated by indicia 1410, assume that three consecutive OOS indications for the SS are needed to start the RLF timer and two consecutive OOS indications for the CSI-RS are needed to start the RLF timer. Assume that two consecutive OOS indications for the SS are generated before the CSI-RS is configured. When the RLM state (cumulative number of existing indications) is inherited, even if only one OOS indication for the CSI-RS occurs after CSI-RS configuration, the RRC knows that the cumulative number of OOS indications is three and starts the RLF timer. When the RLM state is reset, the RRC starts the RLF timer when receiving two consecutive OOS indications for the CSI-RS after CSI-RS configuration.

For the scenario indicated by indicia 1420 in FIG. 14, the RLF timer may be started after the CSI-RS is configured, and when the CSI-RS is released while the IS indication is being generated based on the CSI-RS, RLM may be performed based on the SS again. To stop the RLF timer, the RLM state (cumulative number of existing indications) may be inherited or be reset. When inherited, the number of existing IS indications for the CSI-RS is kept, and when SS indications for the SS occur, the RLF timer is stopped according to the cumulative number of consecutive IS indications regardless of the RS type. When reset, the number of existing IS indications for the CSI-RS is ignored, and the number of consecutive IS indications is counted for the SS to stop the RLF timer.

Timer Value

Figure 15:
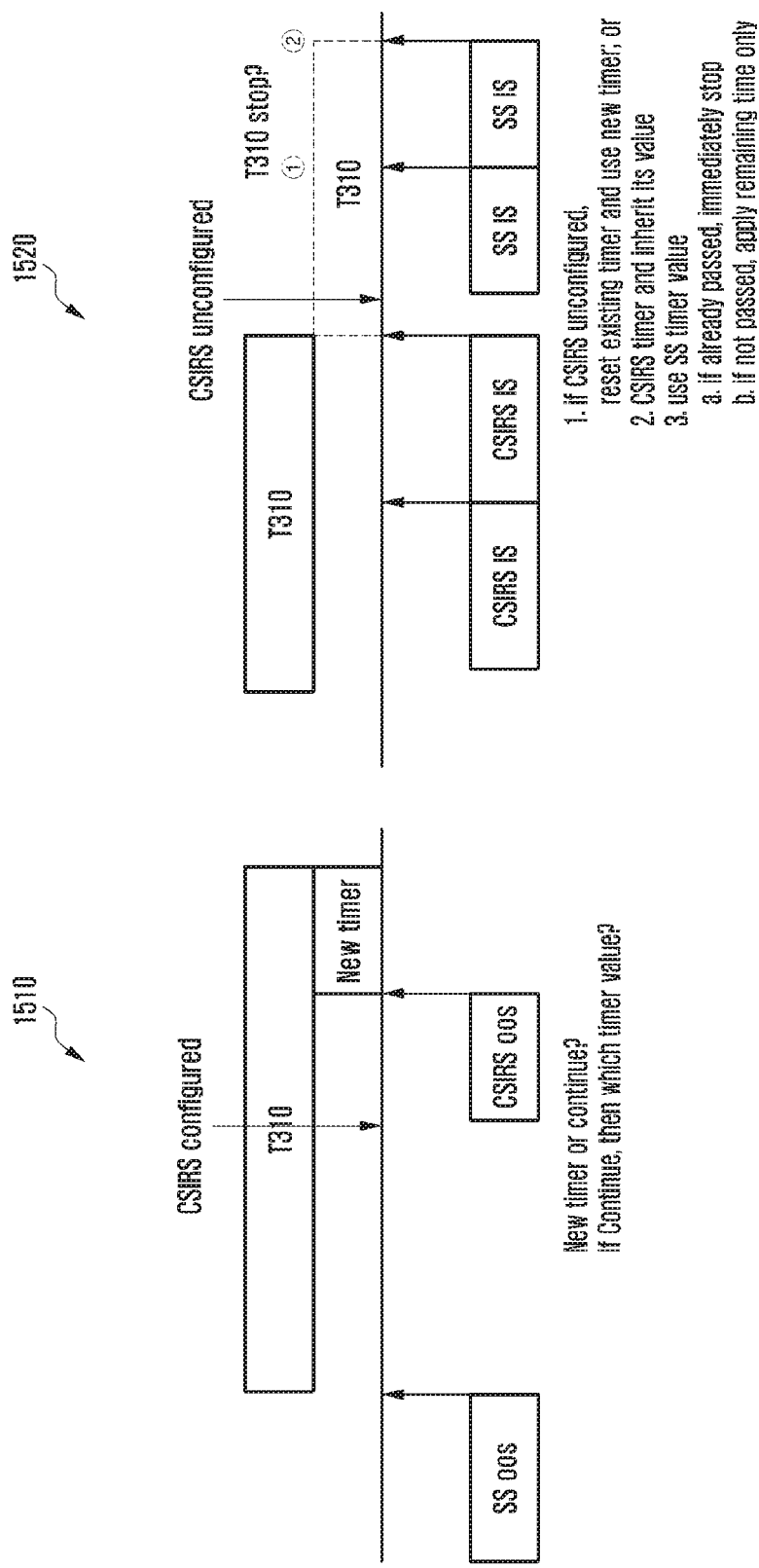
FIG. 15 illustrates a policy that, when the CSI-RS is configured at a specific point in time while performing RLM through the SS, RLM is performed with priority given to the CSI-RS according to an embodiment of the disclosure.

There is a timer value among the RLF parameters for each RS. When the CSI-RS is configured at a specific point in time while performing RLM based on the SS, it can be assumed that a policy for giving priority to the CSI-RS is set at that point in time. In FIG. 15, for the scenario indicated by indicia 1510, the terminal has started the RLF timer according to the OOS indications for the SS. Thereafter, when the CSI-RS is configured, the RLM state (timer value) may be inherited or be reset. When the timer value is inherited, the RLF timer is run until the CSI-RS generates a given number of IS indications by continuously applying the SS RLF timer value or until the timer value expires.

In another embodiment, when the CSI-RS is configured, only the timer value is changed for the CSI-RS and the elapsed timer value can be inherited as it is. When the parameter is to be reset, the previous timer is reset at the time when the CSI-RS is configured. If the CSI-RS measurement generates an IS indication, the timer is stopped, and if the CSI-RS measurement generates a preset number of consecutive OOS indications, the timer is started.

FIG. 15 illustrates a policy that, when the CSI-RS is configured at a specific point in time while performing RLM through the SS, RLM is performed with priority given to the CSI-RS according to an embodiment of the disclosure.

Referring to FIG. 15, for the scenario indicated by indicia 1520, the CSI-RS is configured, the RLF timer for the CSI-RS is run, the CSI-RS measurement generates IS indications, and the CSI-RS is released or unconfigured. In this case, the timer for the CSI-RS may be reset, and the RLF timer for the SS may be newly applied. Alternatively, the CSI-RS timer value may be inherited, and the SS timer can be run until the SS measurement generates a preset number of consecutive IS indications or until the timer value expires. Or, the elapsed timer value may be inherited, and the remaining timer value can be used for the SS timer. When the SS timer value is used, SS, if the elapsed time has already passed the SS timer value, the timer is stopped immediately and a RLF is declared. Otherwise, the SS timer is run until the remaining timer value expires.

Signaling RLF parameter application option

For the above two parameters, a static rule may be used, or the network may dynamically set a rule and notify it to the terminal. In this case, the network may attach a reset/inherit indication to each of the two parameters and transmit this configuration information via, e.g., a RRC connection reconfiguration message.

Figure 16:
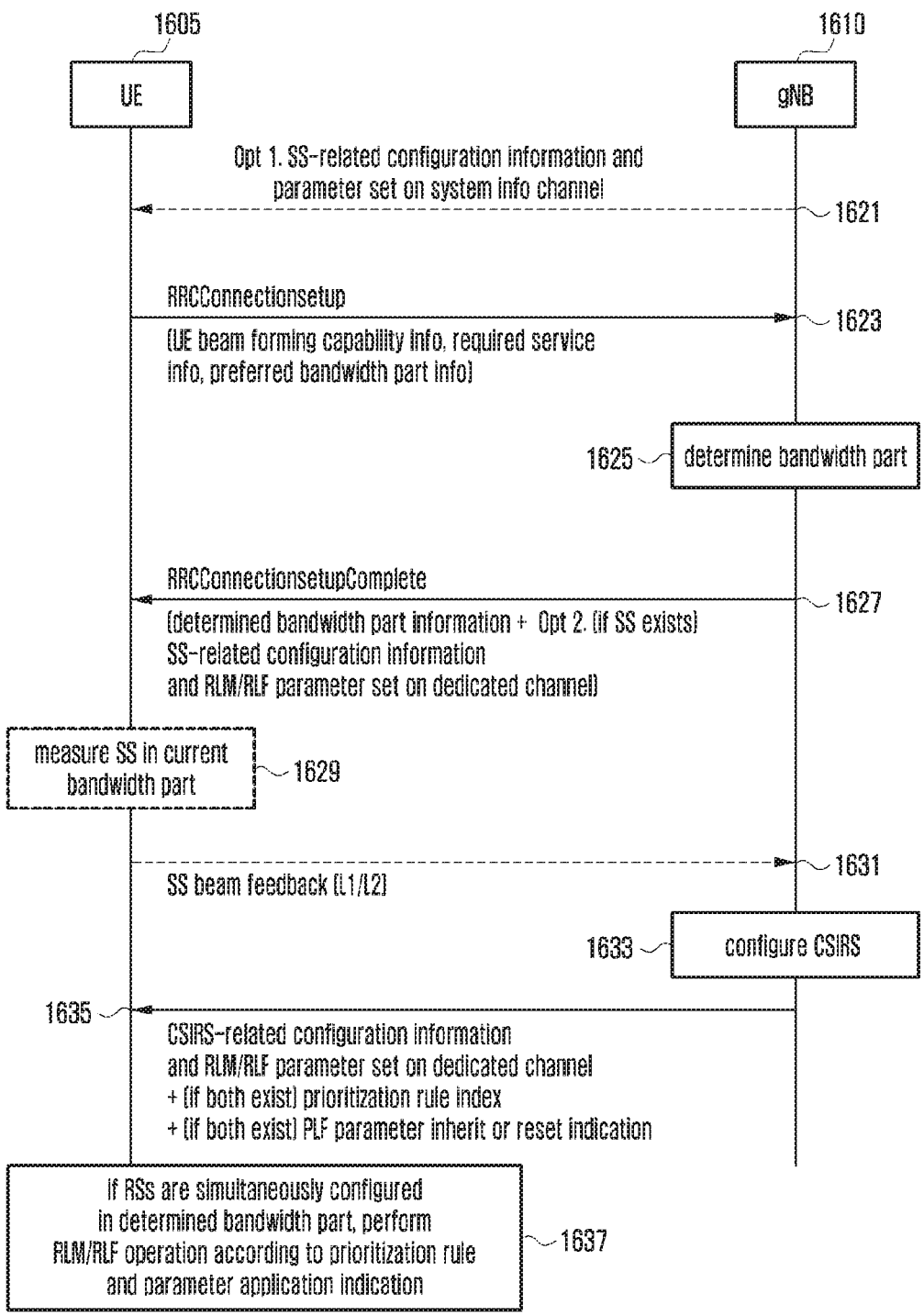
FIG. 16 depicts a case where the base station configures a specific bandwidth part (BWP) on the basis of the capabilities and service requirements of the terminal according to an embodiment of the disclosure.

FIG. 16 depicts a case where the base station configures a specific bandwidth part on the basis of the capabilities and service requirements of the terminal according to an embodiment of the disclosure.

If one type of RS is configured in the currently active bandwidth part, the terminal 1605 operates according to the RLM/RLF parameters and rules for that RS. If two or more types of RS are configured in the active bandwidth part, the terminal 1605 determines an RS type having priority in the bandwidth part according to the priority information between RS types set in advance or configured by the base station 1610, and operates according to the RLM/RLF parameters and rules for the determined RS type.

The base station 1610 permits the use of a specific bandwidth part, and, if the SS is present in the bandwidth part, it transmits the SS configuration information and corresponding parameters via dedicated signaling (at operation 1621). If the CSI-RS is to be configured, the base station 1610 transmits the CSI-RS configuration information and corresponding parameters. If two RSs are to be configured (that is, the SS is transmitted via the bandwidth part and the CSI-RS transmitted via a narrow band beam is required for data transmission and reception of the terminal 1605), the base station transmits the corresponding configuration information, parameters, and a prioritization rule for RLM. In addition, the base station can attach an inherit/reset indication to the parameter whose value is being counted at the time of RLF parameter switching.

Referring to FIG. 16, the SS-related configuration information and RLM/RLF parameter set may be transmitted via a broadcast channel or shared channel through which system information is transmitted (option 1). Or, the initial SS-related RLM/RLF parameters are given to the terminal 1605, and the SS-related configuration information and RLM/RLF parameter set may be transmitted via dedicated signaling using a RRCconnectionReconfiguration message after RRC connection establishment (option 2).

The terminal 1605 transmits its capability information (beamforming, preferred bandwidth and frequency) and service information (delay sensitiveness) to the base station 1610 (at operation 1623). Based on the service information, the base station 1610 assigns a bandwidth part having a numerology matching enhanced mobile broadband (eMBB), ultra-reliable low latency communications (URLLC), or massive machine type communications (mMTC) to the terminal 1605 (at operation 1625). In addition, the base station 1610 checks whether the SS is present in the assigned bandwidth part, and if present, it transmits the SS-related configuration in and corresponding RLM/RLF parameters (at operation 1627).

Thereafter, the terminal 1605 measures the SS in the assigned bandwidth part (at operation 1629), and feeds the measurement result back to the base station 1610 (at operation 1631). The base station 1610 may configure the CSI-RS (at operation 1633). If there is no SS in the assigned bandwidth part, the terminal may measure the SS in the cell or bandwidth part associated with initial RRCConnection and send the measurement information to the base station. Alternatively, the base station can configure the CSI-RS without referring to SS measurement feedback. This CSI-RS will be used in the assigned bandwidth part.

When the CSI-RS is configured, the base station 1610 notifies the terminal 1605 of the corresponding configuration information and parameters, and notifies the RS prioritization index (at operation 1635). Upon determining that the correlation between the received signal strengths of the CSI-RS beam and the SS beam is strong on the basis of the service information received from the terminal 1605 and the beam feedback received from other terminals, the base station 1610 transmits the terminal 1605 an inherit indication for applying the RLF parameters. Otherwise, the base station 1610 transmits the terminal 1605 a reset indication for applying the RLF parameters.

Upon receiving the above information, the terminal 1605 communicates via the assigned bandwidth part, and performs RLM according to the given prioritization rule (at operation 1637).

If there is no SS in the corresponding bandwidth part, RLM/RLF can be performed using only CSI-RS configuration information and parameter information. As another option, the information (frequency, cell ID, or bandwidth part ID) on the bandwidth part in which the SS is present, measurement gap information for measuring the SS, SS configuration information of the bandwidth part, RLF parameter information, prioritization rule information, and reset indication information can be sent to the terminal 1605, and the terminal 1605 can measure both the SS and the CSI-RS while observing the two bandwidth parts in a time division manner and perform RLF operations according to the prioritization rule and the reset indication. If the bandwidth part where the SS is present and the bandwidth part where only the CSI-RS is present are physically separated rather than quasi co-located or co-located sites, the correlation between the received signal strengths of the SS and the CSI-RS may be weak. In this case, the base station 1610 may provide a reset indication for applying the RLF parameters.

Figure 17:
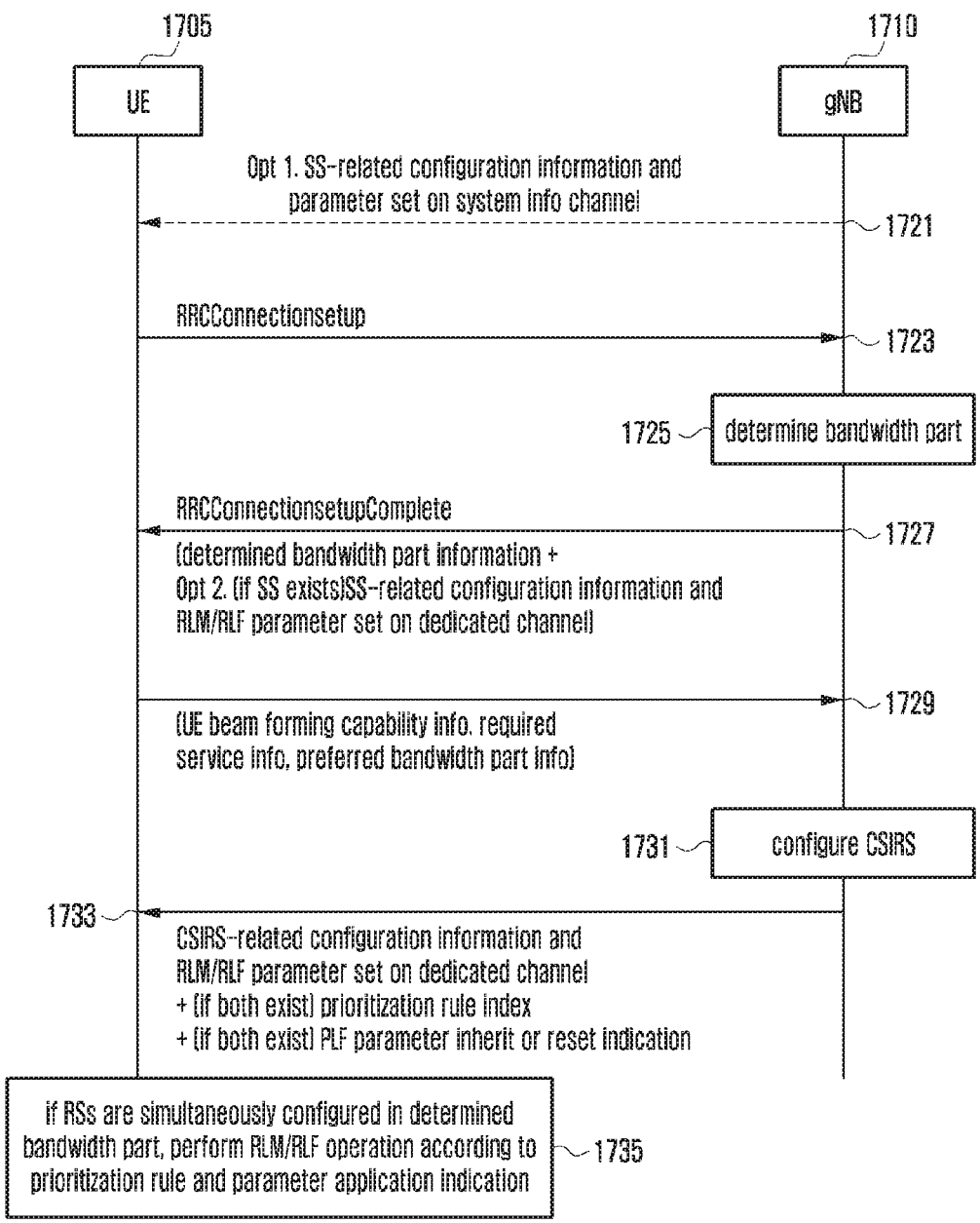
FIG. 17 depicts a case where user equipment (UE) beamforming related capability information, requested service related information, and preferred bandwidth part information are transmitted via a separate RRC messages after connection setup according to an embodiment of the disclosure.

FIG. 17 depicts a case where UE beamforming related capability information, requested service related information, and preferred bandwidth part information are transmitted via a separate RRC messages after connection setup according to an embodiment of the disclosure.

Referring to FIG. 17, the terminal 1705 may transmit the beamforming capability information, required service related information, and preferred bandwidth part information to the base station 1710 after connection setup via a separate RRC message (at operation 1729), not via a RRC-ConnectionSetup message. Upon receiving the above information before configuring the CSI-RS, the base station 1710 transmits the prioritization rule and the RLF parameter inherit/reset indication to the terminal 1705 based on the received information (at operation 1733).

If the beamforming capability information, required service related information, and preferred bandwidth part information are received after configuring the CSI-RS, the base station 1710 transmits the prioritization rule and the RLF parameter inherit/reset indication that are set to the preset default values.

As another option, the terminal 1705 may have present default values for the prioritization rule and the RLF parameter inherit/reset indication. If the base station 1710 does not provide specific values, the terminal 1705 may apply the preset default values.

For operations 1721 to 1735, refer to the corresponding operations in FIG. 16.

As another embodiment, if an RLF is declared owing to the RLM operation performed for each active bandwidth part (BWP) or other causes, the terminal switches itself to a preset BWP and attempts to access the preset BWP. If the connection is successful, the terminal does not declare an RLF. If the connection is unsuccessful, the terminal can declare an RLF and search for a new cell. Here, the preset BWP can be a default BWP or another configured BWP. Access to the preset BWP may be made through the RACH or through the physical uplink control channel (PUCCH) using a dedicated preamble such as a reconnection indication or a scheduling request.

In particular, when the terminal performs switching on a BWP basis, the following embodiments may be added with respect to the RLM/RLF operation.

(1) The network may configure a radio link monitoring reference signal (RLM-RS) to the terminal. The RLM-RS may be a SS (synchronization signal), CRS (cell specific reference signal), SRS (sounding reference signal), or CSI-RS (channel state information reference signal), or a combination thereof. When a RLM-RS is configured to the terminal, the base station may transmit RS information on the time-frequency resource location and code (if code is used). When a specific pattern is agreed between the terminal and the network, the pattern information can be transmitted. Upon receiving this configuration information, the terminal refers to the time-frequency resource of the RLM-RS and applies the RLM parameters associated with the RS, where the physical layer may transmit an IS (in-sync) indication or an OOS (out-of-sync) indication to the higher layer.

The RLM parameters may include an IS threshold (RSRP, RSRQ, RSSI, or BLER in consideration of hypothetical PDCCH transmission) to generate an IS indication if the reception power is higher than the IS threshold, the number of RSs or beams that should be higher than the IS threshold, an OOS threshold to generate an OOS indication if the reception power is lower than the OOS threshold, the number of RSs or beams that should be lower than the OOS threshold, the time window for IS and OOS measurement, and the interval between IS or OOS indications. This parameter information can be notified through dedicated signaling when the RS such as SS or CSI-RS is configured, or can be notified via broadcast signaling using system information.

(2) When the network configures the RLM-RS to the terminal, this RS may be present or may be not present in all the assigned bandwidth parts (BWP). In particular, when the terminal uses a scheduled BWP (active BWP), if there is no RLM-RS in the BWP, the terminal may temporally switch to the BWP including a frequency location where the RLM-RS exists and receive and measure the RLM-RS to generate a periodic indication.

[Fallback to RLM-RS BWP or gap for active BWP] In the above description, switching from the originally scheduled active BWP to a BWP having a RLM-RS is referred to as fallback. The network can provide the terminal with information such as fallback time, stay time at the fallback BWP, return time to switch back to the originally scheduled active BWP, and repetition period of a fallback pattern. When the network schedules a configured BWP not including a RLM-RS for the terminal based on the time information of the RLM-RS, the network can configure a measurement gap for RLM, during which the terminal does not have to monitor the scheduled active BWP. This measurement gap can be specified by information such as the start point of the gap, the duration of the gap, and the repetition period.

When a measurement gap for RLM is configured for the terminal, the terminal monitors the currently scheduled active BWP, switches to the BWP where the RLM-RS is configured at the start time of the gap, receives the RLM-RS for the duration of the gap, and switches back to the original active BWP to perform communication.

Figure 18:
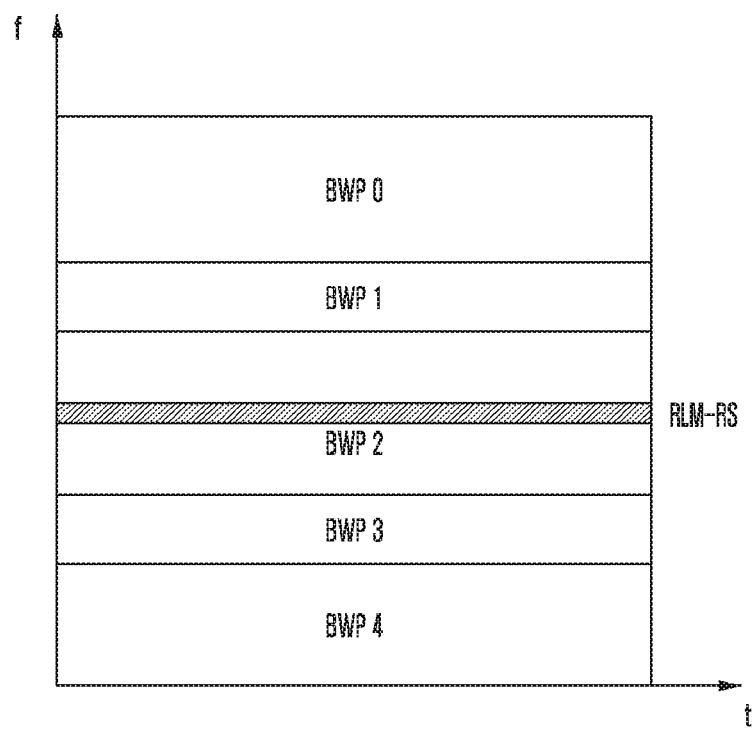
FIG. 18 illustrates a case where the RLM-RS is present only in one frequency range according to an embodiment of the disclosure.

FIG. 18 illustrates a case where the RLM-RS is present only in one frequency range according to an embodiment of the disclosure.

Referring to FIG. 18, if only one RLM-RS exists, the base station can provide the terminal with an RLM-RS configuration independent of the active BWP currently monitored by the terminal (i.e., absolute RLM-RS information). When scheduling an active BWP for the terminal, the base station determines whether the active BWP has an RLM-RS (at operation 1905). If the active BWP has an RLM-RS, the base station may skip transmitting the fallback information or the RLM-RS measurement gap information for a separate RLM-RS BWP (at operation 1910). In this case, the terminal performs RLM without switching to another BWP (at operation 1915).

If the scheduled active BWP has no RLM-RS (at operation 1920), the base station transmits the fallback information and the RLM-RS measurement gap information for the RLM-RS BWP (at operation 1925). Upon receiving this information, the terminal can monitor the active BWP, switch to the RLM-RS fallback BWP or receive and measure the RLM-RS based on the gap information, and return to the original active BWP (at operation 1930).

Figure 19:
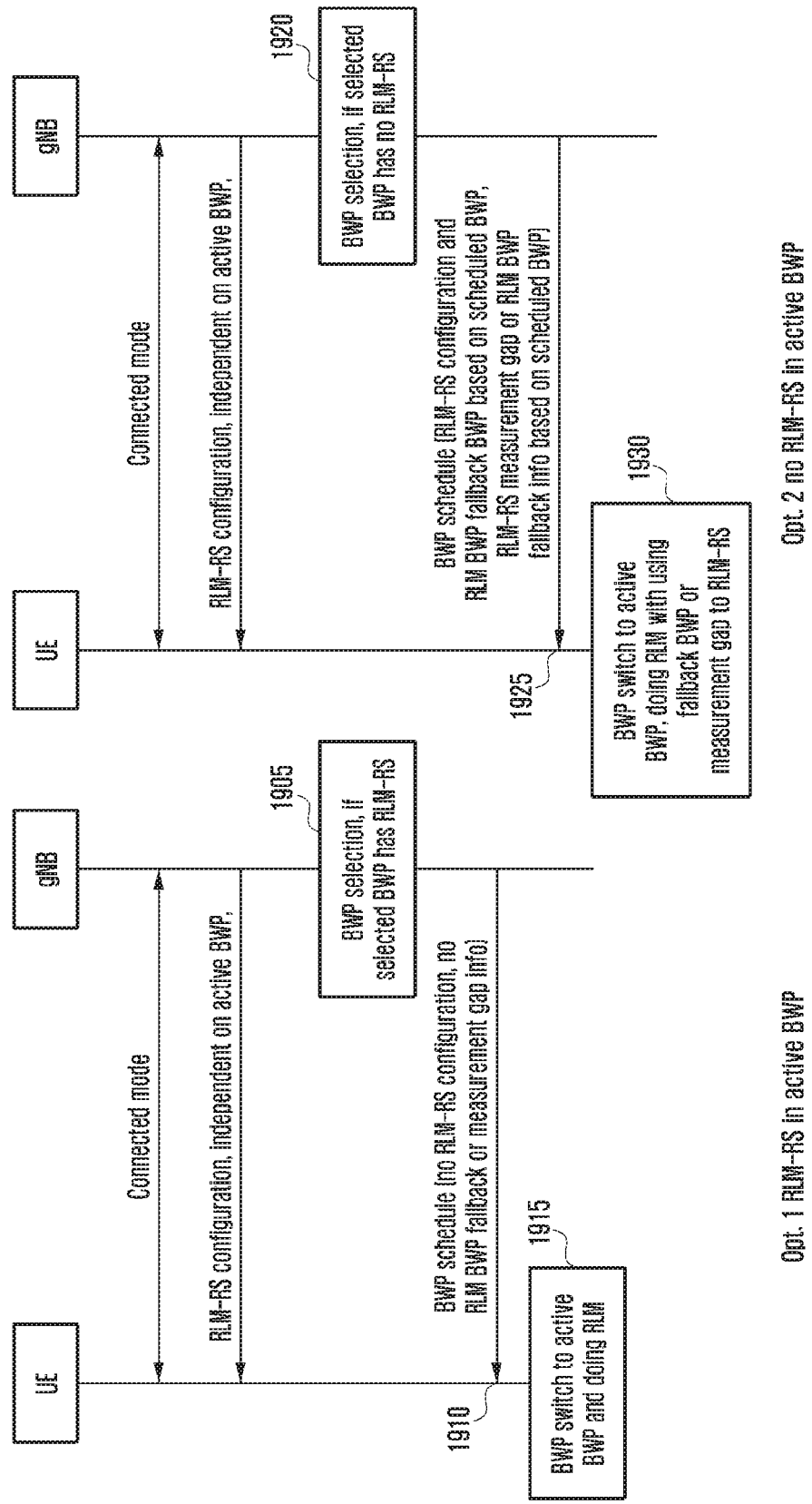
FIG. 19 depicts RLM-RS signaling when the active bandwidth part has an RLM-RS or does not have an RLM-RS according to an embodiment of the disclosure.

FIG. 19 depicts RLM-RS signaling when the active BWP has a RLM-RS and when the active BWP does not have a RLM-RS according to an embodiment of the disclosure.

Figure 20:
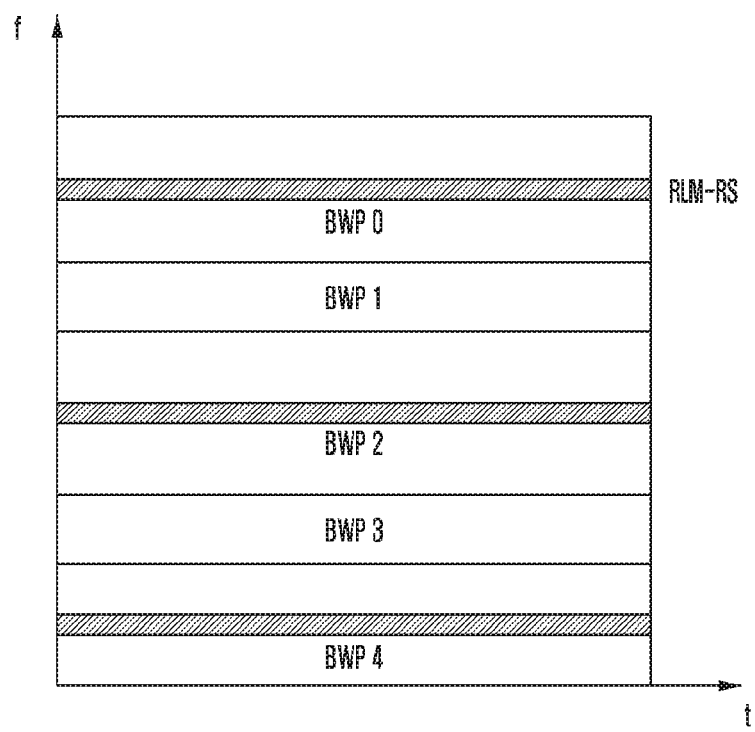
FIG. 20 illustrates a case where the RLM-RS is present in multiple frequency ranges according to an embodiment of the disclosure.

FIG. 20 illustrates a case where the RLM-RS is present in multiple frequency ranges according to an embodiment of the disclosure.

If there are multiple RLM-RSs referring to FIG. 20, different types of RLM-RSs may be used for the active BWPs, and different types of RLM BWPs may be used accordingly.

For example, the RLM-RS close to the active BWP in the frequency domain can be selected and used. In the case of option 2 of FIG. 19, instead of the initially configured RLM-RS, a new RLM-RS can be configured based on the active BWP. In addition, a RLM fallback BWP may be configured based on the newly configured RLM-RS. When an active BWP is configured, the base station can selectively notify this information to the terminal.

For example, if the active BWP is BWP3, the RLM-RS at this time may be the RLM-RS present in BWP4 and the RLM fallback BWP may be BWP4. This configuration may be set as a new configuration where the active BWP is BWP1, the fallback BWP is BWP0, and the RLM-RS is the RLM-RS present in BWP0. In FIG. 19, this is represented as "RLM-RS configuration" and "RLM fallback BWP based on scheduled BWP". The RLM-RS configuration (second signaling in FIG. 19) may refer to all information about the RLM-RS existing in the corresponding cell. The RLM-RS configuration after the active BWP is determined is limited to the information about the RLM-RS to be used when the active BWP is used. The latter information takes precedence over the former information.

(3) As indicated in subsection (2), the RLM-RS may be present in all BWPs. In this case, instead of switching to a specific BWP to measure the RLM-RS, the terminal measures the RLM-RS present in each scheduled active BWP and applies the corresponding RLM parameters to generate an OOS/IS indication.

In the first diagram of FIG. 19 where all RLM-RS information is given, since the base station knows that the RLM-RS is present in all BWPs, it does not provide RLM-RS information specific to the active BWP. The terminal compares the location information of the RLM-RS with the frequency information of the active BWP, recognizes that the RLM-RS is present in the active BWP, and performs RLM operation in the active BWP without performing fallback or measurement gap operations.

(4) If there is an RLM fallback BWP or RLM measurement gap configuration, the terminal measures the RLM-RS at the indicated time to generate an indication and operates the RLF timer by applying the layer 3 parameters based on the indication. However, when an active BWP is scheduled (or switched) and an indication is received owing to the RLM-RS present in each active BWP as described in subsection (3), there is a choice of whether to inherit or reset the current state when applying the L3 parameters.

If the channel correlation between BWPs is not large, the reset option can be applied; and if the channel correlation is large, the inherit option can be applied. For the number of consecutive IS or OOS indications used to start or stop the RLF timer among the L3 parameters, the terminal inherits the RLF parameter state of the previous active BWP (the number of consecutive IS indications generated in the previous active BWP and the number of consecutive OOS indications generated in the previous active BWP) and uses the same in the switched active BWP.

When the RLF timer has been started in the previous active BWP, if a preset number of consecutive IS indications (including inherited ones) are generated from the switched active BWP, the terminal stops the timer. If a preset number of consecutive OOS indications (including inherited ones) are generated from the switched active BWP, the terminal keeps the timer running.

If the channel correlation between BWPs is not large, the reset option can be applied. In this case, at the time when the active BWP is switched (or scheduled) to another BWP, the terminal resets the number of consecutive IS indications generated in the previous active BWP to zero and resets the number of consecutive OOS indications generated in the previous active BWP to zero. If the RLF timer has been started in the previous active BWP, the terminal resets the timer value to the initial value and stops the timer. Thereafter, if a preset number of consecutive IS or OOS indications are generated from the switched active BWP, the terminal operates the timer accordingly.

(5) Since the various RSs can be used as the RLM-RS as described in subsection (1), different RLF parameter sets may be set for different BWPs. When a new active BWP is scheduled, the base station may transmit the terminal at least some of the following values as RLF parameters: the IS threshold (RSRP, RSRQ, RSSI, SINR, or BLER in consideration of hypothetical PDCCH transmission) to generate an IS indication if the reception power is higher than the IS threshold, the OOS threshold (RSRP, RSRQ, RSSI, SINR, or BLER in consideration of hypothetical PDCCH transmission) to generate an OOS indication if the reception power is lower than the OOS threshold, the time window for IS and OOS measurement, the interval between IS or OOS indications sent to the higher layer, the number of RSs or beams that should be higher than the IS threshold for IS indication generation, the number of RSs or beams that should be lower than the OOS threshold for OOS indication generation, the RLF timer value, the number of consecutive OOS indications to start the RLF timer, and the number of consecutive IS indications to stop the running RLF timer.

Figure 21:
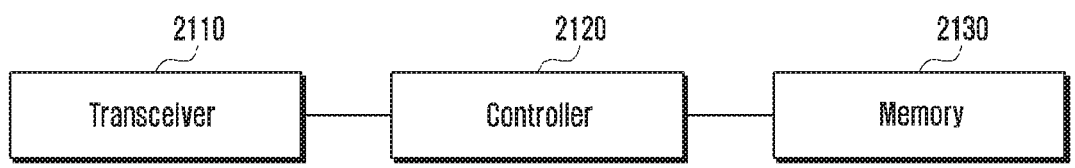
FIG. 21 is a block diagram of a base station according to an embodiment of the disclosure.

FIG. 21 is a block diagram of a base station according to an embodiment of the disclosure.

Referring to FIG. 21, the base station may include a transceiver 2110, a controller 2120 (e.g., at least one processor), and a storage 2130 (e.g., memory).

In the disclosure, the controller 2120 may be a circuit, an application specific integrated circuit, or at least one processor.

The transceiver 2110 can transmit and receive signals to and from other network entities. For example, the transceiver 2110 can transmit system information, synchronization signals, or reference signals to a terminal.

The controller 2120 can control the overall operation of the base station according to the embodiments of the disclosure. For example, the controller 2120 may control the signal flow between blocks to perform the operations described in the above sequence diagrams.

Specifically, the controller 2120 may control the proposed operations to report a radio link problem to the higher layer according to the embodiments of the disclosure.

The storage 2130 may store at least one of information transmitted or received through the transceiver 2110 and information generated by the controller 2120.

For example, the storage 2130 may store information related to an event that is defined to report a radio link problem.

Figure 22:
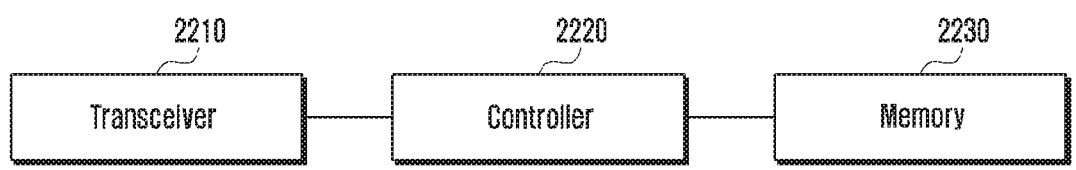
FIG. 22 is a block diagram of a terminal according to an embodiment of the disclosure.

FIG. 22 is a block diagram of a terminal according to an embodiment of the disclosure.

Referring to FIG. 22, the terminal may include a transceiver 2210, a controller 2220 (e.g., at least one processor), and a storage 2230 (e.g., memory).

In the disclosure, the controller 2220 may be a circuit, an application specific integrated circuit, or at least one processor.

The transceiver 2210 can transmit and receive signals to and from other network entities. For example, the transceiver 2210 can receive system information, synchronization signals, or reference signals from the base station.

The controller 2220 can control the overall operation of the terminal according to the embodiments of the disclosure. For example, the controller 2220 may control the signal flow between blocks to perform the operations described in the above sequence diagrams.

Specifically, the controller 2220 can control the operation of measuring the SS, the BRS, or the like in connection to the radio link according to the embodiments of the disclosure.

The storage 2230 may store at least one of information transmitted or received through the transceiver 2210 and information generated by the controller 2220.

For example, the storage 2230 may store information needed for radio link monitoring according to an embodiment of the disclosure.

As described above, the RLM/RLF parameters can be configured differently according to the types of RS. The RLM/RLF parameters can also be configured differently according to the types of service.

Figure 23:
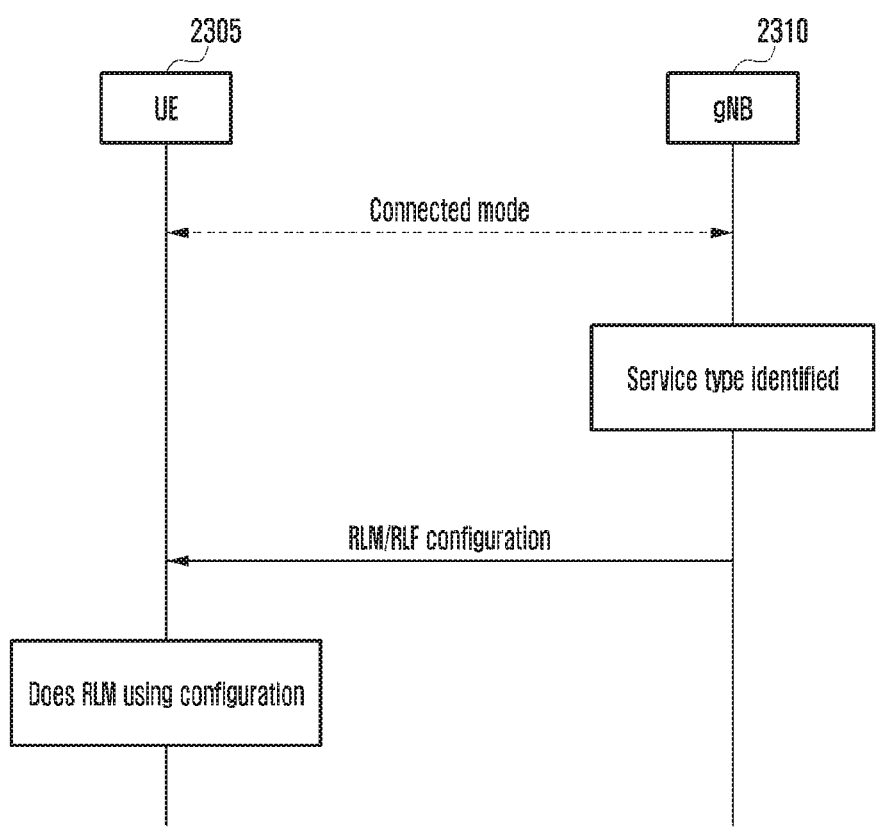
FIG. 23 depicts a case where RLM/RLF parameters are set differently according to the type of a service received by the terminal according to an embodiment of the disclosure.

FIG. 23 depicts a case where RLM/RLF parameters are set differently according to the type of a service received by the terminal according to an embodiment of the disclosure. When the base station 2310 knows the service desired by the terminal 2305, it configures the RLM-RS suitable for the service and configures the RLM/RLF parameters associated with the RLM-RS. Upon receiving the configuration information, the terminal 2305 may perform RLM based on this information and operate the timer according to IS/OOS indications using the RLF parameters to declare an RLF. Here, the RLM parameters sent by the base station 2310 may include the RLM-RS configuration information (RS type, RS time-frequency location, threshold to be compared with a measurement value for each RS), and RLF parameters (RLF timer value, the number of consecutive IS indications, the number of consecutive OOS indications). Upon receiving this information, the terminal 2305 may identify the location of the corresponding RS and transmit a periodic IS or OOS indication to the RRC based on the given RLM parameters. The RRC layer can stop or start the RLF timer when it receives a preset number of consecutive IS or OOS indications.

The base station may identify the service type of the terminal in various ways. When a bearer is set for the terminal, the IP address and port of the corresponding server can be known from the five tuple of IP packets of the E-UTRAN radio access bearer (E-RAB) or flow, and the type of traffic can be identified from the quality of service (QoS) flow information. The base station may know the service type for each bearer from the identified traffic type. If the terminal has multiple bearers for different types of services, the base station can configure the RLM/RLF configuration based on a service with stricter constraints. For example, when a voice over internet protocol (VoIP) service and an ordinary eMBB data service coexist in the terminal, the base station can provide the RLM/RLF configuration based on the failure-sensitive VoIP service due to the characteristics of voice traffic.

The following embodiment can be considered as a structure that can be contained in ASN.1 of the RRC. Since the Pcell or Pscell performs the RLM/RLF operation, the following IE can be carried by the container for the Pcell/Pscell configuration in an RRC message. The following IEs may also be carried by the measConfig IE with the RS configuration for mobility.

PCellConfig or measConfig >
RLM-config
List of RLM-RS

| | |
|---|---|
| List of RLM-resource-config-SS | ex. {SSB1, SSB2, SSB5} |
| List of RLM-resource-config-CSIRS | ex. {1-2 (for 2 level) or 1-1-3 (for 3 level) etc.} |
| Threshold info | |
| Pair_of_BLER_ID | ex. {0 or 1} |

List of RLM-resource-config-SS may include a list of SSB indexes used for the RLM-RS, time-frequency location information, or repeated pattern information. List of RLM-resource-config-CSIRS may include a list of pointers to the CSIRS resources corresponding to some or all of the CSI-RSs currently configured in the Pcell or Pscell, or a list of resources of a newly added CSI-RS (time-frequency location information, repeated pattern information). Pair_of_BLER_ID indicates the ID of a pair of hypothetical PDCCH BLER values used for IS and OOS determination among preset pairs of target hypothetical PDCCH BLER values of the received signal for each RS. This indication may indicate both the BLER to be used and the service mapped with the BLER. For example, "0" may indicate the pair of BLER values used in LTE and indicate a general service. "1" may indicate an eMBB or VoIP service and a pair of preset BLER values associated the service. This service-specific threshold (or BLER value) information can be provided by the base station to the terminal via dedicated signaling. The threshold information may be specified for each service (not for each terminal) in the specification. An RRC message or MAC CE may be used to deliver the threshold information specified for each terminal. In another embodiment, if the BLER value is not set, a preset default BLER value may be applied. For example, when the default BLER is a LTE BLER, if the terminal in connected state receives an RS configuration through RLM-config but does not receive a Pair_of_BLER_ID configuration, it may apply the LTE BLER by default. Later, if a Pair_of_BLER_ID configuration is provided, it may override the default BLER.

Here, the terminal may regard the service type associated with the default BLER as the default service type.

For RLF parameter signaling related to the service type, it is possible to configure the RLF parameters for each service type identified by the system, such as the number of consecutive IS or OOS indications for timer operation, timer value, RS measurement time window (or interval) for OOS determination, and RS measurement time window (or interval) for IS determination. These parameters can be delivered via RLF-TimersandConstants signaling of the CellGroup configuration container among the RRC messages, and the parameters can be configured and transmitted for each service. Among the parameter values configured for each service, the terminal can select and use the RLF parameter corresponding to the service type mapped with the BLER value selected according to a value indicated by Pair_of_BLER_ID of RLM-config.

For example, the RLF parameters corresponding to normal service and VoIP can be delivered at one time in advance as follows.

more, if the corresponding representative value exceeds the BLER threshold, the terminal sends an IS indication to the RRC, and otherwise it sends an OOS indication to the RRC. When a number of consecutive IS or OOS indications indicated by the RLF parameters are received from the physical layer, the RRC starts or stops the RLF timer indicated by the RLF parameters.

In another embodiment, the base station may transmit a command message indicating a subset of pre-configured RSs to instruct the terminal to monitor only the RLM-RS included in the subset. Here, the command message may be an RRC message, a MAC-CE message, or a downlink control information (DCI) message. The command message may also include an absolute or relative indicator to the pre-configured RS.

The command message may instruct the terminal to perform radio link monitoring using the RLM-RS indicated by the command message. In this case, although the terminal may measure and monitor both the indicated RLM-RS and other RSs, the terminal may perform radio link monitoring

```
RLF-TimersAndConstants ::=        CHOICE {
    release                       NULL,
    setup                         CHOICE {
        For_normal_service_param  SEQUENCE {
            t310                  ENUMERATED {
                                      ms0, ms50, ms100, ms200, ms500, ms1000, ms2000},
            n310                  ENUMERATED {
                                      n1, n2, n3, n4, n6, n8, n10, n20},
            t311                  ENUMERATED {
                                      ms1000, ms3000, ms5000, ms10000, ms15000,
                                      ms20000, ms30000},
            n311                  ENUMERATED {
                                      n1, n2, n3, n4, n5, n6, n8, n10}.
        }
        For_VoIP                  SEQUENCE {
            t310                  ENUMERATED {
                                      ms0, ms50, ms100},
            n310                  ENUMERATED {
                                      n1, n2, n3, n4},
            t311                  ENUMERATED {
                                      ms1000, ms3000, ms5000, ms10000, ms15000},
            n311                  ENUMERATED {
                                      n1, n2, n3, n4}.
        }
    }
}
```

Figure 24:
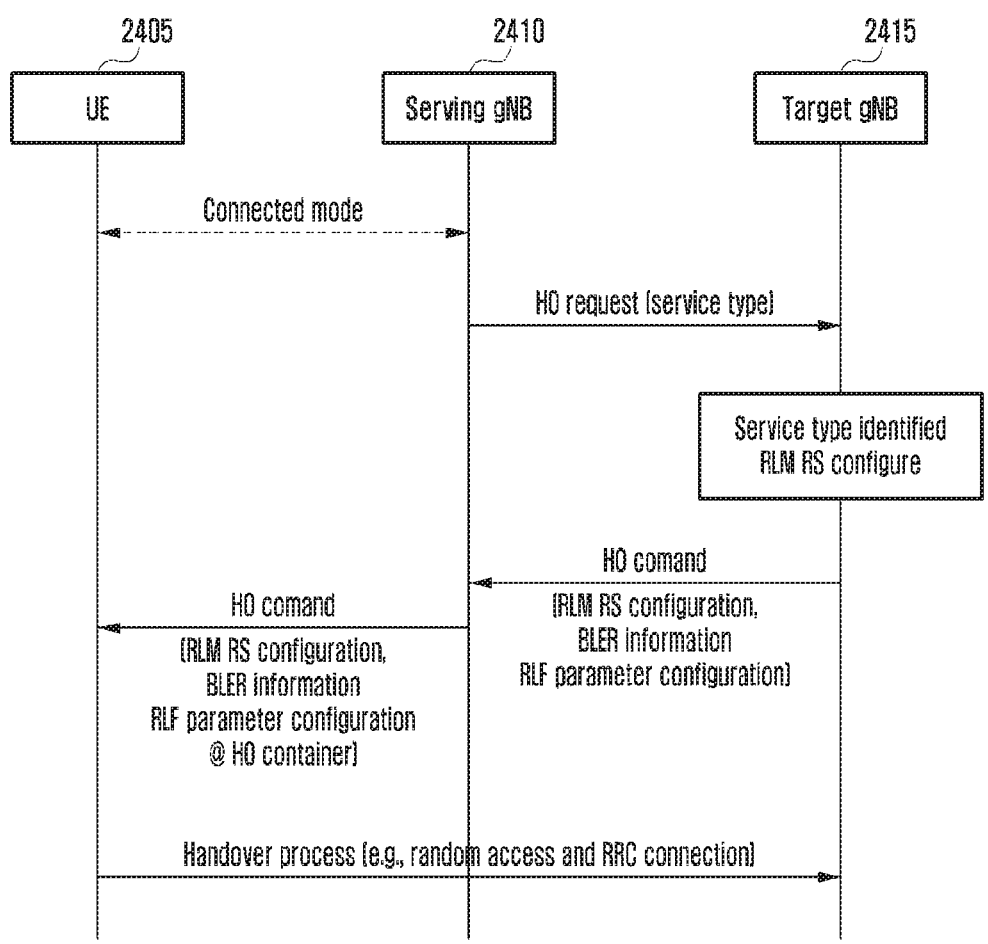
FIG. 24 depicts a handover situation where the target cell receives service information of the terminal from the serving cell and transmits correspondingly configuration information about the RLM RS, block error rate (BLER), and RLF parameters to the serving cell according to an embodiment of the disclosure.

The base station can transmit the RLM configuration information when the terminal transitions from idle state to connected state or when the terminal makes the initial RRC connection. In the case of handover to another cell as shown in FIG. 24, the target cell 2415 receives the service information of the corresponding terminal from the serving cell 2410, and transmits the RLM-RS configuration, the BLER setting information, and the RLF parameters to the serving cell 2410 based on the received service information. The serving cell 2410 may forward this information via an RRC message. In addition, when the serving cell recognizes that the service type of the terminal 2405 in connected state has changed as described above, the serving cell 2410 may transmit new BLER information via a RRC reconfiguration message or transmit both new BLER information and information on the newly configured RLM-RS.

Upon receiving the above configuration information, the terminal checks the RLM-RS configuration information, and measures the received signal strength (RSRQ, RSRP, or SINR) of each RS for a specific time period to generate a preset number of samples, and converts the sample values into a representative value. For a preset number of RSs or (e.g., generating an out-of-sync indication or an in-sync indication and sending it to the higher layer) by using only the RLM-RS indicated by the command message.

In another embodiment, instead of monitoring all RSs pre-configured as the RLM-RS, the base station may transmit a command message to instruct the terminal to monitor, when a specific BWP is configured for the terminal, only the RS corresponding to the frequency range of the configured BWP or the RSs dedicated to the configured BWP among the RSs set as the RLM-RS. Here, the command message may be an RRC message, a MAC-CE message, or a DCI message. The command message may also include an absolute or relative indicator to the pre-configured RS.

The command message may instruct the terminal to perform radio link monitoring using the RLM-RS indicated by the command message. In this case, although the terminal may measure and monitor both the indicated RLM-RS and other RSs, the terminal may perform radio link monitoring (e.g., generating an out-of-sync indication or an in-sync indication and sending it to the higher layer) by using only the RLM-RS indicated by the command message.

The command message may instruct the terminal to, when the terminal switches the BWP, find and monitor the RLM- RS suitable for the switched BWP so as to generate an out-of-sync indication or an in-sync indication and send it to the higher layer by using the suitable RLM-RS.

In another embodiment, the base station may transmit a command message containing a numeric value to instruct the terminal to perform RLM. Here, the command message may be an RRC message, a MAC-CE message, or a DCI message. Upon receiving the command message, the terminal may measure the available RLM-RSs, list the measurement values and RS IDs in order of performance, and perform radio link monitoring (e.g., generating an out-of-sync indication or an in-sync indication and sending it to the higher layer) by using the same number of RSs as the received value.

In the above embodiments, when signaling the RLF timer and constants for each threshold corresponding to a particular service, the base station may configure the timer and constants for each service threshold and send them to the terminal via ue-TimersAndConstants IE or rlf-TimersAndConstants IE. Thereafter, when the base station detects a change in the service type and transmits only an indication to a changed BLER threshold pair for IS/OOS determination, it may not transmit the RLF timer and constant values together with the threshold pair indication signaling. In this case, signaling overhead can be reduced since the base station does not have to transmit again all the changed values of the other RLF parameters according to the service type change. The timer and constants configuration per threshold described above can be applied to all timers that are affected by the service change. For example, this is applicable to T301, T310, T313, T311, N310, N311, N313, and N314.

terminal, it can indicate an association between the RS and a bandwidth part (BWP). Based on the RS-BWP association the terminal can use only the RLM-RS associated with the currently active BWP for the RLM operation. ASN.1 level signaling for this is as follows. The RLM-RS list created by the base station is a set of RLM-RSs, and each RLM-RS can indicate the RS type (SSB or CSI-RS).

Each RLM-RS may include an index of the BWP where the RLM-RS is to be activated. If the SSB is used for RLM, the RS can be specified by the index of the SSB operated by the serving cell. If the CSI-RS is used for RLM, some of the CSI-RSs configured for beam management of the SpCell can be used as the CSI-RS for RLM. To refer to this, the predefined CSI-RS resource ID may be used to designate the CSI-RS for RLM. The CSI-RS designation can be transmitted together with the time-frequency location information and repeated information of the corresponding CSI-RS. In addition, the base station may transmit thresholds serving as a criterion for determining the level of the reception strength of the RSs for IS or OOS indications. In this case, a threshold pair index associated with preset thresholds can be delivered instead of the thresholds themselves. Based on the threshold pair index, the terminal may select one of the threshold pairs predefined in the standard and apply the selected threshold pair to RLM.

These parameters can be delivered via a RRC message, MAC CE, or DCI. The following shows a case where the parameters are included in SpCell configuration of a RRC message.

```
SpCellConfig ::=            SEQUENCE {
    -- Parameters for the synchronous reconfiguration to the target SpCell:
    reconfigurationWithSync    SEQUENCE {
        spCellConfigCommon             ServingCellConfigCommon,
        newUE-Identity                 RNTI-Value,
        t304                           ENUMERATED {ms50, ms100, ms150, ms200, ms500,
ms1000, ms2000, ms10000-v1310},
        rach-ConfigDedicated           RACH-ConfigDedicated   OPTIONAL -- Need M
    }                                                          OPTIONAL,
    -- Cond SpCellChange
    rlm-config                         RLM-RSConfig           OPTIONAL, -- Need M
    spCellConfigDedicated    ServingCellConfigDedicated       OPTIONAL -- Need M
}
SCellToReleaseList ::=         SEQUENCE (SIZE (1..maxNrofSCells)) OF SCellIndex
SCellToAddModList ::=          SEQUENCE (SIZE (1..maxNrofSCells)) OF SCellConfig
SCellConfig ::=                SEQUENCE {
    sCellIndex                     SCellIndex,
    sCellConfigCommon              ServingCellConfigCommon      OPTIONAL, -- Cond
SCellAdd
    sCellConfigDedicated           ServingCellConfigDedicated OPTIONAL -- Cond SCellAddMod
}
RLM-RSConfig ::=           SEQUENCE {
    rlmInSyncOutOfSyncThreshold    INTEGER (0..1)         OPTIONAL, -- Need M
    rlmRSList                      SEQUENCE (SIZE (1..8)) OF RLM-RS
}
RLM-RS ::=             CHOICE {
    RLM-SSB                INTEGER (0..63)
    RLM-CSIRS              INTEGER (0..NZP-CSI-RS-ResourceMax - 1)
}
```

In the above embodiments, instead of monitoring all RSs configured as the RLM-RS, the base station may transmit a command message to instruct the terminal to monitor, when a specific BWP is configured for the terminal, only the RS corresponding to the frequency range of the configured BWP or the RSs dedicated to the configured BWP among the RSs set as the RLM-RS. This signaling is described in more detail. When the base station configures the RLM-RS for the RLM-RS is an IE that sets properties of individual RLM-RSs included in rlmRSList. Each RLM-RS may be either an SSB or a CSI-RS. The SSB can be specified using the SSB index used in the corresponding cell. The CSI-RS can be specified using the CSI-RS resource index set for beam management or RRM in the corresponding cell. In this case, each SSB or CSI-RS may further include information on which RSs are assigned to which BWPs. For example, the base station may include the bandwidth part ID for which the SSB or CSI-RS is used and the RS index in this signaling IE. In case of CSI-RS, time related information of the RS may be further included. For example, periodicity information and a slot offset indicating the position of the reference subframe at which a repetition pattern starts may be further included.

The network can assign a maximum number of RLM-RSs and a minimum number of RLM-RSs to each configured BWP, and the terminal can monitor only the RLM-RS assigned to the currently active BWP. Here, the maximum and minimum number of RLM-RSs may be specified by the standard specification or the base station. The base station may identify the number of RSs that can be simultaneously monitored by the terminal based on the capability information received from the terminal. Currently, to perform the RLM operation of the active BWP, the minimum number of RLM-RSs may be one or more.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method by a terminal, the method comprising:
   receiving a radio resource control (RRC) message including first information associated with a reference signal for a radio link monitoring (RLM) and second information associated with a threshold for the RLM;
   monitoring a radio link quality of at least one reference signal indicated by the first information on an active downlink bandwidth part (BWP) on a primary cell (PCell);
   comparing the radio link quality of the at least one reference signal with the threshold; and
   indicating an in-sync or an out-of-sync to a higher layer of the terminal based on the comparison result,
   wherein the first information is configured per a BWP configuration of the PCell.

2. The method of claim 1, wherein the first information includes at least one of a synchronization signal block (SSB) index or a channel state information—reference signal (CSI-RS) index.

3. The method of claim 1, wherein the second information includes a block error rate (BLER) threshold pair index.

4. The method of claim 3, wherein the BLER threshold pair index corresponds to a first threshold for the in-sync and a second threshold for the out-of-sync.

5. The method of claim 4,
   wherein, in a case that at least one radio link quality of the at least one reference signal is greater than the first threshold, the in-sync is indicated to the higher layer of the terminal, and
   wherein, in a case that all radio link quality of the at least one reference signal is lower than the second threshold, the out-of-sync is indicated to the higher layer of the terminal.

6. A method by a base station, the method comprising:
   transmitting a radio resource control (RRC) message including first information associated with a reference signal for a radio link monitoring (RLM) and second information associated with a threshold for the RLM to a terminal; and
   transmitting at least one of a synchronization signal block (SSB) or a channel state information—reference signal (CSI-RS),
   wherein the first information is used for indicating at least one of the SSB or the CSI-RS to be monitored on an active downlink bandwidth part (BWP) on a primary cell (PCell) for a radio link quality,
   wherein the first information is configured per a BWP configuration of the PCell, and
   wherein the second information is used for comparing the radio link quality and the threshold to indicate an in-sync or an out-of-sync to a higher layer of the terminal.

7. The method of claim 6,
   wherein the first information includes at least one of an SSB index or a CSI-RS index,
   wherein the second information includes a block error rate (BLER) threshold pair index,
   wherein the BLER threshold pair index corresponds to a first threshold for the in-sync and a second threshold for the out-of-sync,
   wherein, in a case that at least one radio link quality of at least one reference signal is greater than the first threshold, the in-sync is indicated to the higher layer of the terminal, and
   wherein, in a case that all radio link quality of the at least one reference signal is lower than the second threshold, the out-of-sync is indicated to the higher layer of the terminal.

8. A terminal comprising:
   a transceiver configured to transmit and receive a signal; and
   at least one processor configured to:
      receive a radio resource control (RRC) message including first information associated with a reference signal for a radio link monitoring (RLM) and second information associated with a threshold for the RLM,
      monitor a radio link quality of at least one reference signal indicated by the first information on an active downlink bandwidth part (BWP) on a primary cell (PCell),
      compare the radio link quality of the at least one reference signal with the threshold, and
      indicate an in-sync or an out-of-sync to a higher layer of the terminal based on the comparison result,
   wherein the first information is configured per a BWP configuration of the PCell.

9. The terminal of claim 8, wherein the first information includes at least one of a synchronization signal block (SSB) index or a channel state information—reference signal (CSI-RS) index.

10. The terminal of claim 8, wherein the second information includes a block error rate (BLER) threshold pair index.

11. The terminal of claim 10, wherein the BLER threshold pair index corresponds to a first threshold for the in-sync and second threshold for the out-of-sync.

12. The terminal of claim 11, wherein, to indicate the in-sync or the out-of-sync to the higher layer of the terminal, the at least one processor is further configured to:
   if at least one radio link quality of the at least one reference signal is greater than the first threshold, indicate the in-sync to the higher layer of the terminal, and
   if all radio link quality of the at least one reference signal is lower than the second threshold, indicate the out-of-sync is indicated to the higher layer of the terminal.

13. A base station comprising:
   a transceiver configured to transmit and receive a signal; and at least one processor configured to:
- transmit a radio resource control (RRC) message including first information associated with a reference signal for a radio link monitoring (RLM) and second information associated with a threshold for the RLM to a terminal, and
- transmit at least one of a synchronization signal block (SSB) or a channel state information—reference signal (CSI-RS), wherein the first information is used for indicating at least one of the SSB or the CSI-RS to be monitored on an active downlink bandwidth part (BWP) on a primary cell (PCell) for a radio link quality, wherein the first information is configured per a BWP configuration of the PCell, and wherein the second information is used for comparing the radio link quality and the threshold to indicate an in-sync or an out-of-sync to a higher layer of the terminal.

14. The base station of claim 13, wherein the first information includes at least one of an SSB index or a CSI-RS index, wherein the second information includes a block error rate (BLER) threshold pair index, wherein the BLER threshold pair index corresponds to a first threshold for the in-sync and a second threshold for the out-of-sync, wherein, in a case that at least one radio link quality of at least one reference signal is greater than the first threshold, the in-sync is indicated to the higher layer of the terminal, and wherein, in a case that all radio link quality of the at least one reference signal is lower than the second threshold, the out-of-sync is indicated to the higher layer of the terminal.

* * * * *